(12) United States Patent
Bromberg

(10) Patent No.: US 11,448,774 B2
(45) Date of Patent: Sep. 20, 2022

(54) BAYESIAN GEOLOCATION AND PARAMETER ESTIMATION BY RETAINING CHANNEL AND STATE INFORMATION

(71) Applicant: Movano Inc., Pleasanton, CA (US)

(72) Inventor: Matthew C. Bromberg, Wenatchee, WA (US)

(73) Assignee: Movano Inc., Pleasanton, CA (US)

( * ) Notice: Subject to any disclaimer, the term of this patent is extended or adjusted under 35 U.S.C. 154(b) by 538 days.

(21) Appl. No.: 16/541,730

(22) Filed: Aug. 15, 2019

(65) Prior Publication Data
US 2020/0057163 A1 Feb. 20, 2020

Related U.S. Application Data

(60) Provisional application No. 62/764,814, filed on Aug. 16, 2018.

(51) Int. Cl.
*G01S 19/29* (2010.01)
*G01S 19/25* (2010.01)
(Continued)

(52) U.S. Cl.
CPC .......... *G01S 19/29* (2013.01); *G01S 19/256* (2013.01); *G06F 17/142* (2013.01);
(Continued)

(58) Field of Classification Search
CPC ........ G01S 19/29; G01S 19/256; G01S 5/021; G01S 5/0215; G01S 5/0278; G01S 7/417;
(Continued)

(56) References Cited

U.S. PATENT DOCUMENTS 6,571,104 B1  5/2003  Nanda et al.
7,119,739 B1 * 10/2006  Struckman ............. G01R 29/10
                                                        342/372
(Continued)

FOREIGN PATENT DOCUMENTS

JP   H 11510981 A   9/1999
WO   WO 2004/075577 A1   9/2004
(Continued)

OTHER PUBLICATIONS

Al-Salihi, H. et al., "Bayesian Compressed Sensing-based Channel Estimation for Massive MIMO Systems," EURASIP Journal on Wireless Communications and Networking, Dec. 31, 2017, pp. 1-5.
(Continued)

*Primary Examiner* — Jaime M Holliday
(74) *Attorney, Agent, or Firm* — Loza & Loza, LLP

(57) ABSTRACT

There is provided a method of parameter estimation in a multi-channel signal environment where a plurality of receive antennas receive signals from one or more transmitters that transmit a signal or wave that is reflected from one or more targets, or receive antennas that receive directly from the transmitters, whose received signals are processed over multiple frequencies or channels by a digital receiver. The method comprises (a) calibrating before the operation of the digital receiver to determine the free parameters of a mathematical model of a channel either as the channel model parameters or in the form of tabulated data; (b) calibrating during the operation of the digital receiver to determine the channel model; (c) comparing received antennas array voltages to an analytic or table driven channel model from a calibrated template without only relying on information lossy intermediate steps such as delay time of arrival or angle of arrival measurements; (d) creating a statistical likelihood function modeling receiver noise to determine model channel parameters or prior channel uncer- (Continued)

GPS Receiver From Multiple Satellite Transmitters tainty; (e) saving target reflector/emitter parameters to be reused for dynamic tracking; and (f) using Bayesian particle filtering or Maximum Likelihood Methods to update mixture models for the unknown parameters.

32 Claims, 7 Drawing Sheets
(7 of 7 Drawing Sheet(s) Filed in Color)

(51) Int. Cl.
| | |
|---|---|
| *H04W 4/029* | (2018.01) |
| *G06F 17/14* | (2006.01) |
| *H04B 7/06* | (2006.01) |
| *G06K 9/62* | (2022.01) |
| *G06V 10/82* | (2022.01) |

(52) U.S. Cl.
CPC ......... *G06K 9/6278* (2013.01); *H04B 7/0632* (2013.01); *H04W 4/029* (2018.02); *G06V 10/82* (2022.01)

(58) Field of Classification Search
CPC .. G06F 17/142; G06K 9/6278; G06K 9/6296; H04B 7/0632; H04W 4/029; G06V 10/82
See application file for complete search history.

(56) References Cited

U.S. PATENT DOCUMENTS

| | | | |
|---|---|---|---|
| 9,304,184 B1* | 4/2016 | Draganov | ............... G01S 19/47 |
| 2004/0072577 A1* | 4/2004 | Myllymaki | ............... G01S 5/02 |
| | | | 370/480 |
| 2008/0198072 A1 | 8/2008 | Elwell et al. | |
| 2009/0042526 A1 | 2/2009 | Maulik et al. | |
| 2010/0008406 A1 | 1/2010 | Sawai et al. | |
| 2011/0287801 A1 | 11/2011 | Levin et al. | |

FOREIGN PATENT DOCUMENTS

| | | |
|---|---|---|
| WO | WO 2013/013169 A1 | 1/2013 |
| WO | WO 2016/174679 A2 | 11/2016 |

OTHER PUBLICATIONS

PCT International Search Report and Written Opinion, PCT Application No. PCT/US2019/046737, dated Dec. 5, 2019, 8 pages.
PCT International Search Report and Written Opinion, PCT Application No. PCT/US2019/046741, dated Dec. 5, 2019, 9 pages.
Non-Final Office Action, U.S. Appl. No. 16/542,342; (dated Jun. 20, 2022), 17 pgs.

* cited by examiner

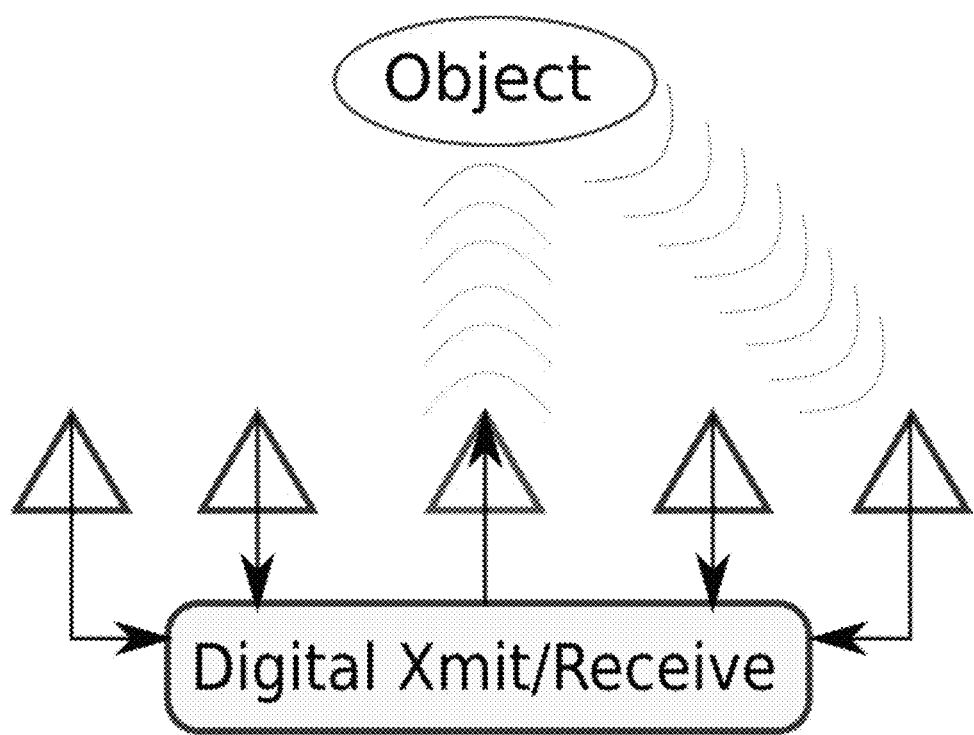
Figure 1: Radar Transceiver

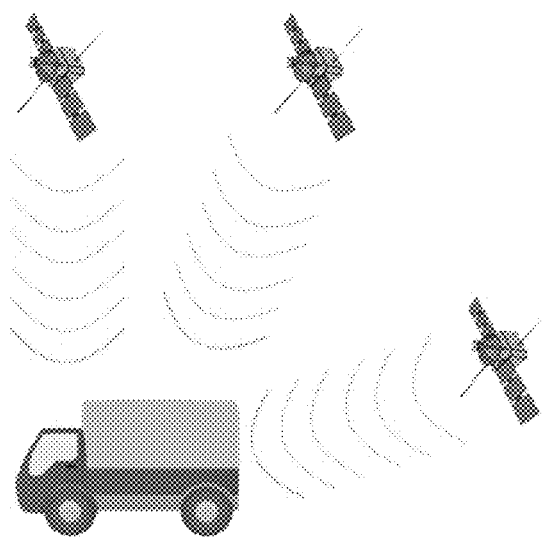
Figure 2: GPS Receiver From Multiple Satellite Transmitters
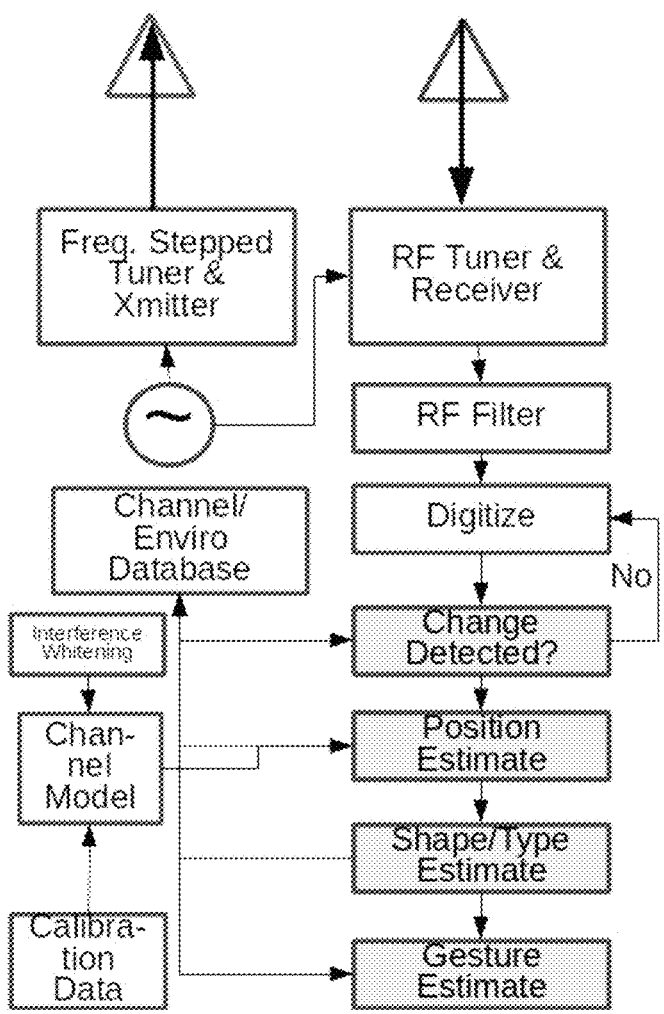
Figure 3: Transceiver Block Diagram

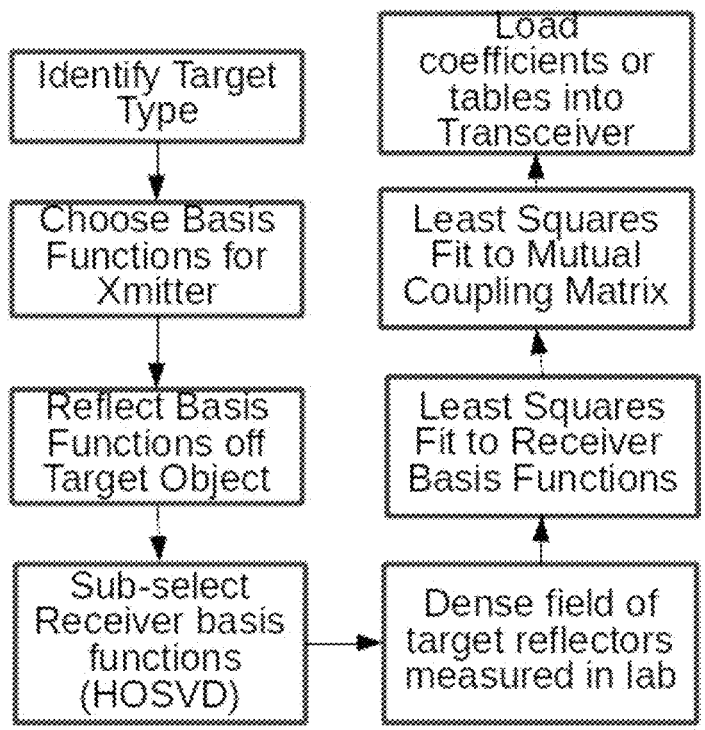
Figure 4: Calibration Procedure
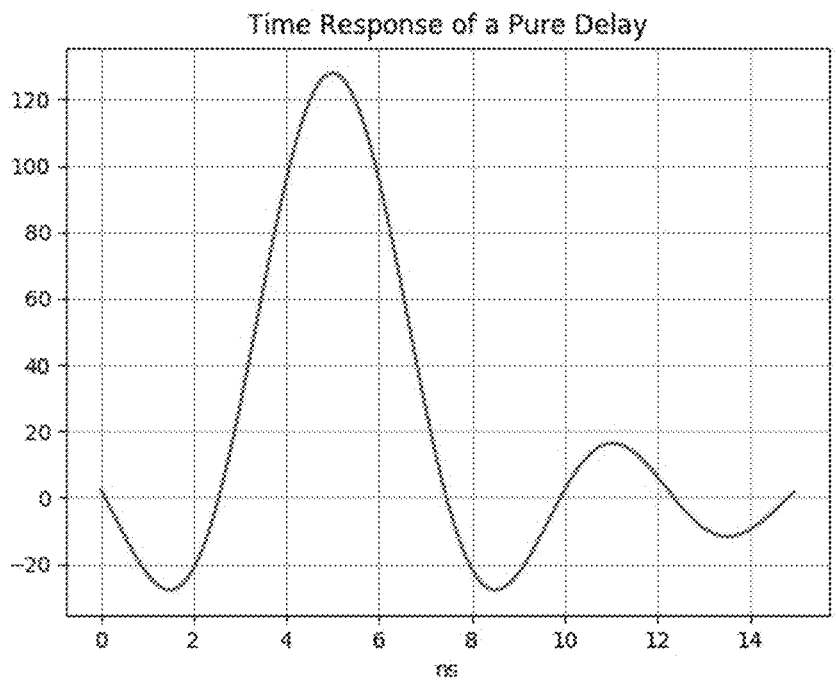
Figure 5: Delay Impulse

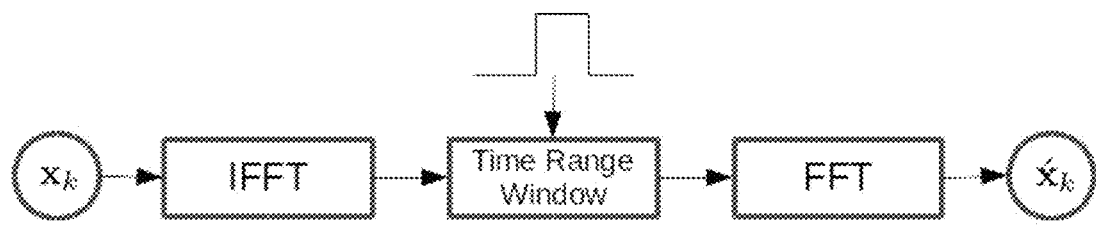
Figure 6: Time Delay Filtering
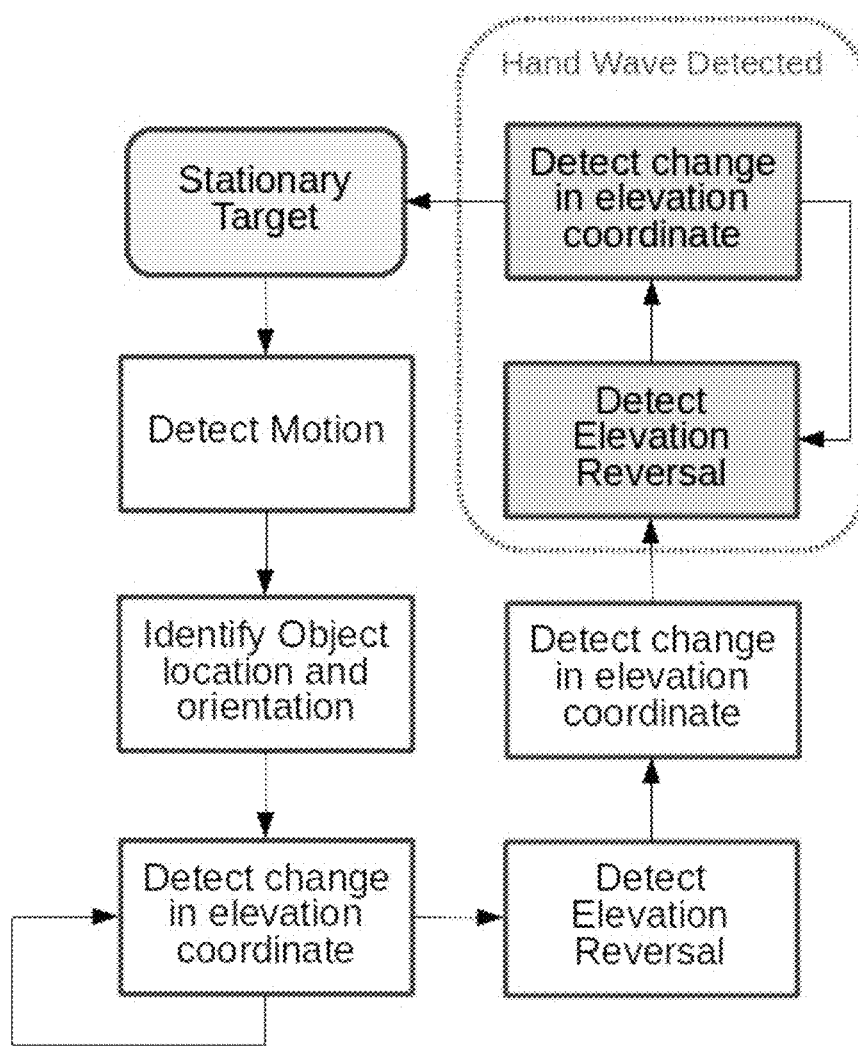
Figure 7: Hand Wave Gesture Detection

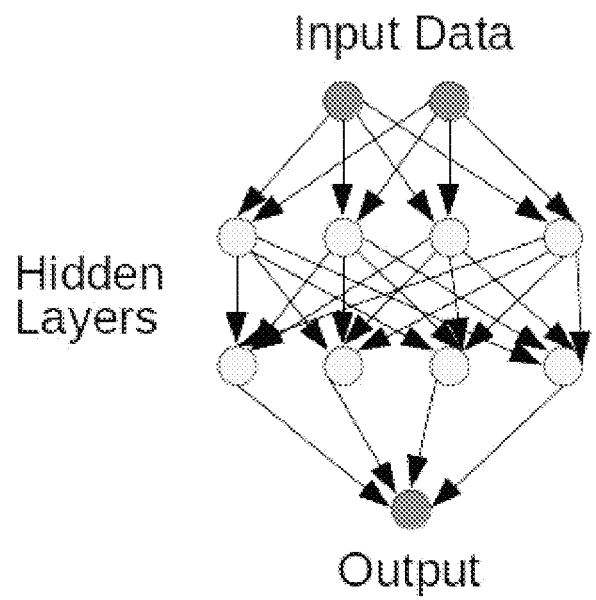
Figure 8: Multilayer Neural Network
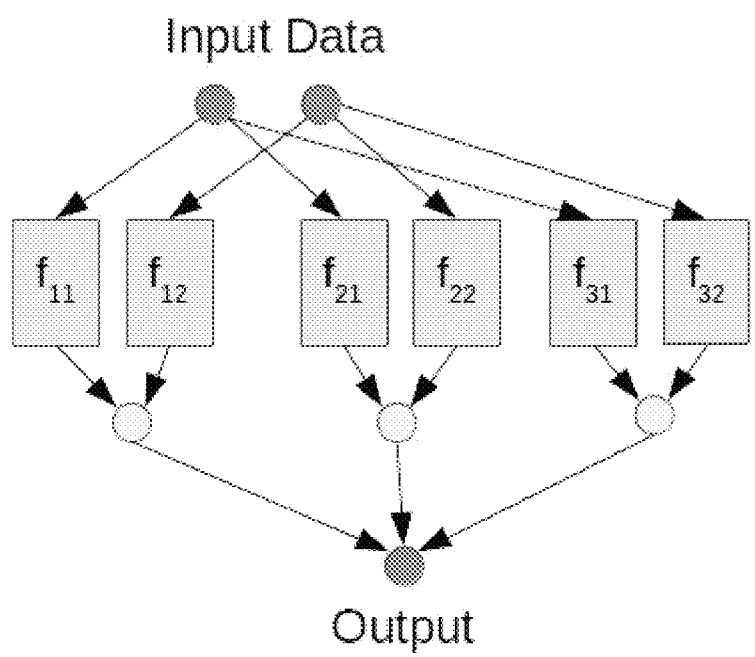
Figure 9: HOSVD Learning Network

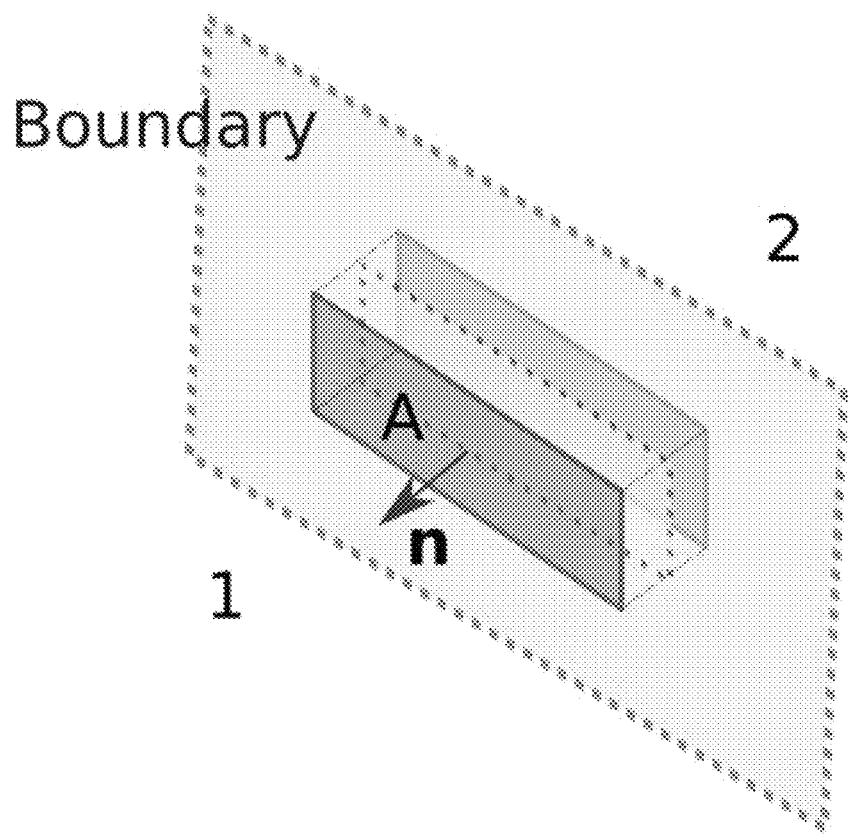
Figure 10: Integration Box
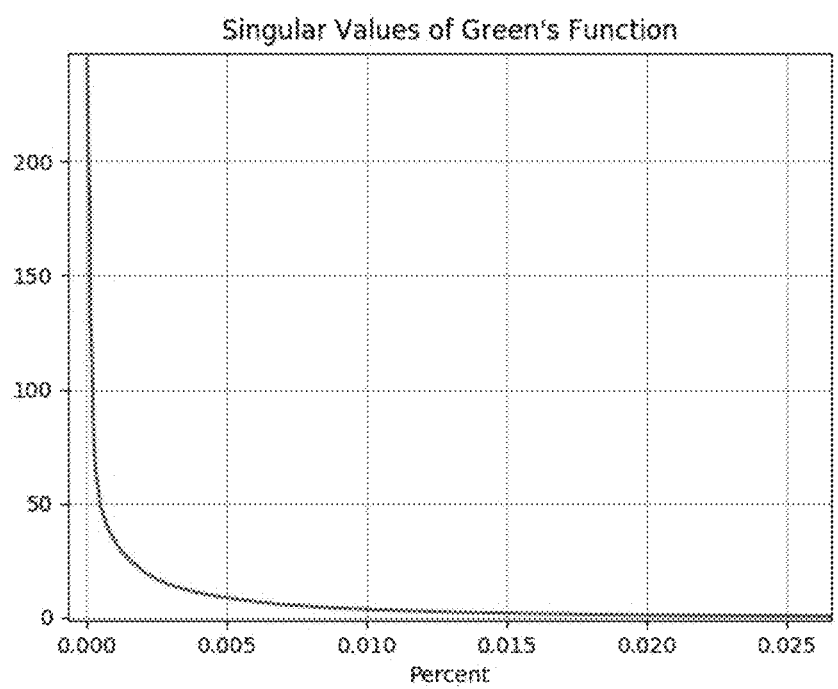
Figure 11: HOSVD Singular Values

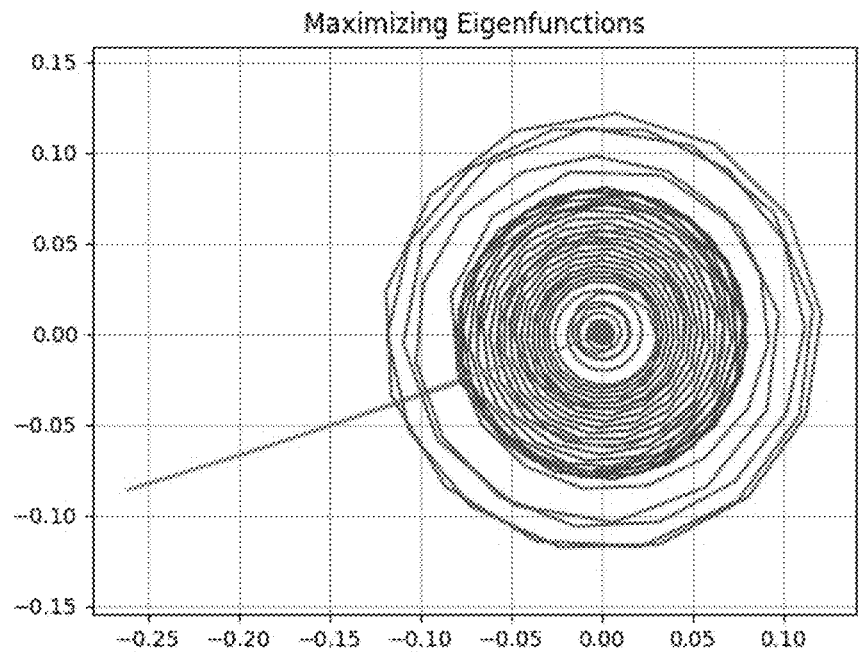
Figure 12: Locus of Maximal Singular Functions
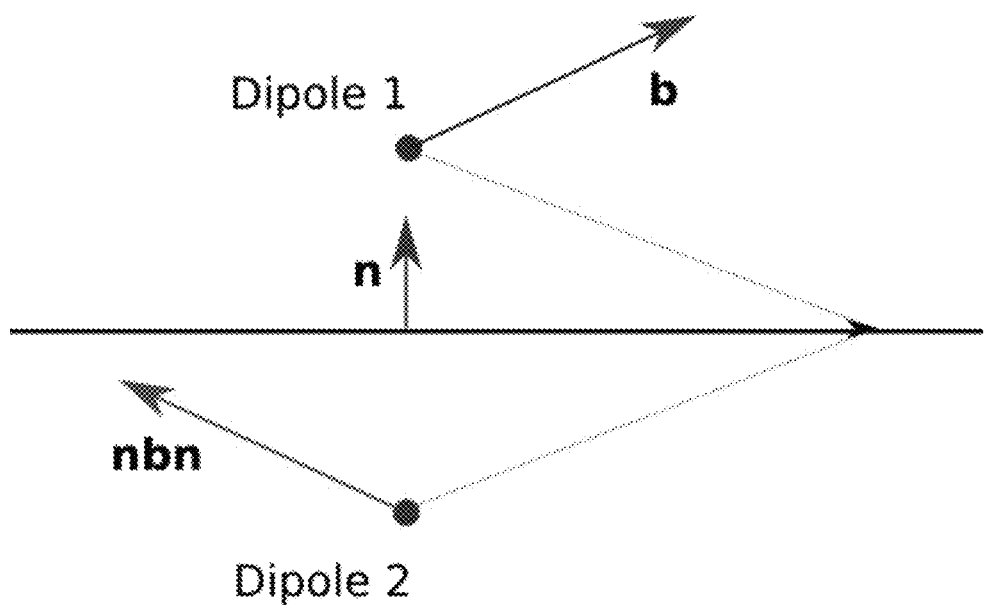
Figure 13: Dipole Image

BAYESIAN GEOLOCATION AND PARAMETER ESTIMATION BY RETAINING CHANNEL AND STATE INFORMATION

CROSS REFERENCE TO RELATED INVENTIONS

The present invention claims priority to U.S. Provisional Application Ser. No. 62/764,814 filed on Aug. 16, 2018, which is incorporated in its entirety by reference.

BACKGROUND OF THE INVENTION

The problem of parameter estimation for electromagnetic signals remains a central one for geolocation, tracking, pattern recognition, medical imaging, threat detection and for the detection of gestures and other time varying behavior. Most geolocation techniques used rely on phase and angle measurements or line of bearing measurements which are known to be sub-optimal.

Recently, however, techniques have arisen which do not take the information lossy step of only saving time of arrival or angle of arrival, but instead consider the entire channel. These techniques have been extended for the pure geolocation application in the presence of interference. However, there are additional missing considerations for these techniques to achieve their full potential.

First and foremost an adequate model of the channels in question as well as an understanding of the model errors and non-idealities are needed. Indeed previous techniques are potentially very sensitive to calibration errors, and furthermore it does not address near field channels which need to be modeled in order to handle near field applications, such as gesture modeling, shape modeling, medical imaging and security applications. These simple channel models are also inadequate to handle radar, especially in the near field.

There is also a need to marry the extensive literature and novel techniques in the field of Bayesian estimation, since this allows one to naturally obtain error estimates and it is well suited for applying machine learning models for pattern recognition. In particular one or more embodiments of the invention look at models of Gaussian mixtures and solve them using techniques similar to Gaussian Sum particle filters. Gaussian sum filters have been used in part for the tracking problem, but using GPS to obtain geolocation. Techniques provided lieleni will apply to both the near and far field and be more accurate due to the removal of information lossy steps.

Adding some novel techniques for obtaining solutions to electromagnetic boundary problems, along with some cutting edge techniques in Bayesian estimation, and by retaining channel state information directly, one or more embodiments are directed to obtain a novel approach to the estimation and detection problem for multiple antennas/transmitters.

SUMMARY OF THE INVENTION

One or more emboidments of the invention are directed to the use of multi-antenna radar to identify and classify objects of interest as depicted in FIG. 1. However, the technology can apply to any device that transmits and receives over multiple antennas or that receives over diverse positions in space or transmits over diverse transmitters. An example of the latter would be a GPS application as shown in FIG. 2.

The baseline transceiver block diagram is shown in FIG. 3. The transceiver consists of a clock and tuner that phase synchronizes both the transmitter and the receiver. The transmit waveform is typically a stepped frequency tuner, that transmits pure tones over multiple frequencies, sweeping over those frequencies at a fixed rate. The receiver receives those tones after the signal is possibly reflected from an external object. For other applications the transmitter is not present and the receiver is simply channelized.

The direct path transmit waveform is isolated from the receivers via RF shielding, and delay filtering if needed (described below). If a change is detected in the environment, a position estimate is formed using Bayesian estimation with a likelihood function formed using a channel model that models the electromagnetic scattering over the presumed target type. The estimation is essentially performed using hypothesis testing on the target position, coupled with prior information about previous targets.

Both the target type (shape or dielectric constants etc.) are determined by computing the Bayesian posterior probability of that type category. The Bayesian estimation is described below in Parameter Estimation and Tracking. The channel model uses data obtained through careful calibration of both the antenna arrays, the antenna noise models, and the scattering type. The channel model is described in below in System Model and the calibration procedure is described in Calibration. A more detailed step by step description of the calibration process is illustrated in FIG. 4. Each target type must go through an independent calibration procedure, since the target type will determine the basis function coefficients.

Numerous other advantages and features of the invention will become readily apparent from the following detailed description of the invention and the embodiments thereof, from the claims, and from the accompanying drawings.

BRIEF DESCRIPTION OF THE FIGURES

The patent or application file contains at least one drawing executed in color. Copies of this patent or patent application publication with color drawing(s) will be provided by the Office upon request and payment of the necessary fee. A fuller understanding of the foregoing may be had by reference to the accompanying drawings, wherein:

FIG. 1 is a radar transceiver;
FIG. 2 is a GPS receiver from multiple satellite transmitters;
FIG. 3 is a transceiver block diagram;
FIG. 4 is a calibration procedure;
FIG. 5 is a delay impulse;
FIG. 6 is a Time delay filtering;
FIG. 7 is a hand wave gesture detection algorithm;
FIG. 8 is a multi-layer neural network;
FIG. 9 is a learning network based on higher order SVDs (HOSVD);
FIG. 10 is a integration box for boundary value calculations;
FIG. 11 shows the HOSVD singular values of a Green's function;
FIG. 12 is a locus plot of maximal singular functions; and
FIG. 13 shows a dipole image through a reflector.

DESCRIPTION OF THE INVENTION

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

System Model

The invention proposes in one or move embodiments a general receiver model that can be utilized for localization, object classification or even medical imaging. The model focuses on a set of views of the environment that depend on a parameter vector of interest p. Consider a diverse set of K observations of an emitter (or passive scatterer) on one or more multi-antenna receivers/sensors. The observations are indexed by k for k=1:K. The "receivers" may in fact be simply a view of the signal of interest at K different frequencies, or it may be K receivers at different spatial locations, possibly separated by time, it may be a single receiver, receiving a signal from K transmitters or it may be a view of the signal after correlating over K different basis functions or code words.

The received signal by the k'th receiver (or during the k'th observation) is modeled by, $$x_k(t) = \sum_{q=1}^{Q} \mathcal{H}_{kq}(\alpha_{kq}, p_q, s_{kq}(t)) + i_k(t), \quad (1)$$

where $x_k(t)$ is the $M_k \times 1$ received waveform vector at sensor k and time t, $i_k(t)$ is an additive interference plus noise process for sensor k, $\mathcal{H}_{kq}(\alpha_{kq}, p, s_{kq}(t))$ is a vector channel process that modulates the transmitted signal $s_{kq}(t)$. Sensor k receives signals from possibly Q different emitters or from Q different reflectors. The channel process depends on a set of possibly random unknown parameters unique to sensor k and emitter Q, $\alpha_{kq}$ and a global parameter vector $p_q$, which is of primary interest to our receiver processing algorithms. The $p_q$ parameter might consist of geolocation coordinates, target velocity, X-ray mass absorption coefficients, or other signal invariants of interest.

If it is assumed that each view of the environment is statistically independent (though this requirement can be relaxed), one obtains the following likelihood function, $$P(x|p) = \prod_{k=1}^{K} \int_{\alpha_k} f_k\left(x_k - \sum_{q=1}^{Q} \mathcal{H}_{kq}(\alpha_{kq}, p_q, s_{kq}(t))\right) g_k(\alpha_{kq}) d\alpha_{kq},$$

where $P(x|p)$ is the probability of observing the total view column vector $x = [x_1^T, x_2^T, \ldots, x_K^T]^T$, given $p = [p_1^T p_2^T, \ldots p_Q^T]^T$, $f_k(x)$ is the probability density function for the interference process $i_k$, and $g_k(\alpha_{kq})$ is the prior distribution of the noisy, free parameters of the channel process $\mathcal{H}_k(\cdot)$.

Linear Channel Model

Often of great interest is the narrow band channel model, which treats the channel process as a simple complex multiply. This approximation is valid for linear time invariant systems, whose signal of interest is either narrow band, or has been channelized into several narrow band channels. In this case, in part the k index can serve as a channel index. Equation (1) is written as, $$x_k(t) = \sum_{q=1}^{Q} \mathcal{H}_{kq}(\alpha_{kq}, p_q) s_{kq}(t) + i_k(t). \quad (2)$$

The notation can be further simplified by writing this in the time sampled digital domain as, $$x_k(n) = H_k s_k(n) + i_k(n),$$

$$H_k \equiv [\mathcal{H}_{k1}(\alpha_{k1}, p_1), \mathcal{H}_{k2}(\alpha_{k2}, p_2) \ldots, \mathcal{H}_{kQ}(\alpha_{kQ}, p_Q)]$$

where n is the time sample index, $H_k$ is the $M_k \times Q$ channel matrix as a function of the nuisance parameter vector $\alpha_k \equiv [\alpha_{k1}^T, \alpha_{k2}^T \ldots \alpha_{kQ}^T]$ and parameter of interest vector $p \equiv [p_1^T, p_2^T, \ldots p_Q^T]^T$, for all Q emitters/reflectors. Also the emitter signal waveforms are packed into the $Q \times 1$ signal vector $s_k(n) \equiv [s_{k1}(n), s_{k2}(n) \ldots, s_{kQ}(n)]^T$.

Colored Gaussian Interference

Some processing simplifications can be made by subsuming all unmodeled interfering waveforms into the single interference vector $i_k(n)$ and further presuming that this interference is complex Gaussian, yet not white. In particular it can be presumed the interference takes the form of a zero mean multivariate, complex circularly symmetric Gaussian vector, $$p_i(i_k|R_{ii}) = |\pi R_{i_k i_k}|^{-1} \exp(-i^H R_{i_k i_k}^{-1} i).$$

The zero mean Gaussian normal distribution is referred to by, N (0, $R_{i_k i_k}$), and one can also define the complex normal distribution function as, $$N(i,R) \equiv |\pi R|^{-1} \exp(-i^H R^{-1} i).$$

This allows the likelihood function to be written as, $$p(x_k \mid H_k, s_k) = \prod_{n=1}^{N} |\pi R_{i_k i_k}|^{-1} \exp\left(-Tr\left(R_{i_k i_k}^{-1} o(x_x(n) - H_k s_k(n))\right)\right),$$

where Tr(•) is the matrix trace operator and $o(a) \equiv aa^H$ is the outer product operator.

We now perform some manipulations to expose the sufficient statistics for the probability function as follows:

$$p(x_k \mid H_k, s_k) = |\pi R_{i_k i_k}|^{-N} \exp\left(-Tr\left(R_{i_k i_k}^{-1} \sum_{n=1}^{N} o(x_k(n) - H_k s_k(n))\right)\right) \quad (3)$$

$$= |\pi R_{i_k i_k}|^{-N} etr\left(-N R_{i_k i_k}^{-1} \left(\hat{R}_{x_k x_k} - H_k \hat{R}_{x_k s_k}^H - \ldots\right.\right.$$
$$\left.\left. \hat{R}_{x_k s_k} H_k^H + H_k \hat{R}_{s_k s_k} H_k^H\right)\right),$$

where the time averaged cross and auto correlation matrices are defined by $$\hat{R}_{AB} \equiv \frac{1}{N} \sum_{n=1}^{N} A(n) B^H(n),$$

and where etr $(A) \equiv \exp(\text{Tr}(A))$. A matrix version of completing the square provides a way to identify sufficient statistics for this problem. We write:

$$p(x_k|H_k, s_k) = |\pi R_{i_k i_k}|^{-N} \text{etr}(-N R_{i_k i_k}^{-1}(\hat{R}_{x_k x_k} - \hat{R}_{x_k s_k} \hat{R}_{s_k s_k}^{-1} \hat{R}_{x_k s_k}^H + \ldots (H_k - \hat{R}_{x_k s_k} \hat{R}_{s_k s_k}^{-1}) \hat{R}_{s_k s_k} (H_k - \hat{R}_{x_k s_k} \hat{R}_{s_k s_k}^{-1})^H)).$$

Note that $\hat{H}_k \equiv \hat{R}_{x_k s_k} \hat{R}_{s_k s_k}^{-1}$ is a least squares approximation of the channel matrix, and that $\hat{R}_{i_k i_k} \equiv \hat{R}_{x_k x_k} - \hat{R}_{x_k s_k} \hat{R}_{s_k s_k}^{-1} \hat{R}_{x_k s_k}^H$ is an estimate of the interference covariance matrix. This allows one to write, $$p(x_k|H_k, s_k) = \eta \text{etr}(-N R_{i_k i_k}^{-1}((H_k - \hat{H}_k) \hat{R}_{s_k s_k} (H_k - \hat{H}_k)^H))$$

$$\eta \equiv |\pi R_{i_k i_k}|^{-N} \text{etr}(-N R_{i_k i_k}^{-1} \hat{R}_{i_k i_k}). \quad (4)$$

This makes $\hat{H}_k \equiv \hat{R}_{x_s s_k} \hat{R}_{s_k s_k}^{-1}$ a sufficient statistic given $R_{i_k i_k}$ and $s_k$.

We can write this in the whitened form, $$p(x_k|H_k,s_k) = \eta \text{etr}(-N(\hat{H}_{sk} - \tilde{\tilde{H}}_{sk})^H(\tilde{H}_{sk} - \tilde{\tilde{H}}_{sk})) \quad (5)$$

where $\tilde{H}_{sk} \equiv R_{i_k}^{-H} H_k \hat{R}_{s_k}^H$ is the interference whitened and signal power normalized channel matrix for view k, and where $\tilde{\tilde{H}}_{sk} \equiv R_{i_k}^{-H} \hat{R}_{x_k s_k} \hat{R}_{s_k}^{-1}$, is an estimate of the interference whitened and signal power normalized channel matrix. The matrix $R_{i_k}$ is the upper triangular Cholesky factor of $R_{i_k i_k}$ with $R_{i_k}^{-H}$ being the Hermitian transpose of the inverse of that matrix. Similarly $\hat{R}_{s_k}^H$ is the Hermitian transpose of the Cholesky factor of $\hat{R}_{s_k s_k}$.

The interference matrix and it's Cholesky factors can be estimated independently, either by observing the system in a quasi-stationary state, or by canceling out all known signals of interest.

This result is dependent on $s_{kq}(n)$ being a sufficiently wide band signal to make $\hat{R}_{s_k s_k}$ a full rank matrix. We must also cover the very important case of $\hat{R}_{s_k s_k}$ being a rank one matrix, since an important special case is where we have either a channelized system, with channel index k, or a stepped-frequency radar. For this case, it is easiest to presume that $H_k$ is actually a rank-1 vector modeled as the sum of it's multipath components, $$H_k \equiv h_k = \sum_{q=1}^{Q} h_{kq}(p) \alpha_{kq}. \quad (6)$$

Here we assume that the position parameters p is shared by all reflected multipath components.

Narrow Band Channels

The important case wherein $s_{kq}(n)$ is a narrow band signal, such as a sinusoid requires special treatment. This case would arise, for example when the signal is a multi-tone signal common in stepped frequency radar, or a known signal type that has been channelized.

If one specializes to the case wherein k represents a frequency $f_k$ and q is associated with a path delay $\tau_q$, we can approximate the signal of interest as, $$s_{kq}(n) \approx s_k(n) e^{-2\pi j f_k \tau_q},$$

where $s_k(n)$ is a narrow band signal centered at $f_k$.

$$\hat{R}_{x_k s_k} = \hat{r}_{x_k s_k} v_k^H,$$

where $$\hat{r}_{x_k s_k} = \frac{1}{N} \sum_{n=1}^{N} x_k(n) s_k^*(n),$$

and $v_k \equiv \left[e^{-2\pi j f_k \tau_1}, e^{-2\pi j f_k \tau_2} \ldots e^{-2\pi j f_k \tau_Q}\right]^T.$ Similarly we have, $$\hat{R}_{s_k s_k} = \hat{r}_{s_k s_k} v_k v_k^H.$$

This allows Equation (3) to be written as, $$p(x_k | H_k, s_k) = |\pi R_{i_k i_k}|^{-N} \text{etr}\big(-N R_{i_k i_k}^{-1} \big(\hat{R}_{x_k x_k} - H_k v_k \hat{r}_{x_k s_k}^H - \ldots$$
$$\hat{r}_{x_k s_k} v_k^H H_k^H + \hat{r}_{s_k s_k} H_k v_k v_k^H H_k^H\big)\big),$$
$$= |\pi R_{i_k i_k}|^{-N} \text{etr}\big(-N R_{i_k i_k}^{-1} \big(\hat{R}_{i_k i_k} - \ldots$$
$$(\hat{h}_k - h_k) \hat{r}_{s_k s_k} (\hat{h}_k - h_k)^H \big)\big),$$

-continued where $\hat{h}_k \equiv \hat{r}_{x_k s_k} / \hat{r}_{s_k s_k}$, $h_k = H_k v_k$, and $$\hat{R}_{i_k i_k} \equiv \hat{R}_{x_k x_k} - \hat{r}_{x_k s_k} \hat{r}_{x_k s_k}^H / \hat{r}_{s_k s_k}.$$

Similar to Equation (5), one can write the whitened version of the likelihood function for the narrow band channel as, $$p(x_k|H_k,s_k) = \eta \exp(-N\hat{r}_{s_k s_k} \|\tilde{h}_k - \hat{\tilde{h}}_k\|^2) \quad (7)$$

$$\eta = |\pi R_{i_k i_k}|^{-N} \text{etr}(-N R_{i_k i_k}^{-1} \hat{R}_{i_k i_k}),$$

where $\tilde{h}_k \equiv R_{i_k}^{-H} h_k$ and $\hat{\tilde{h}}_k \equiv R_{i_k}^{-H} \hat{h}_k$.

Aperture Noise Model

For proper estimation of channel parameters it is critical to have an accurate noise model of the aperture vector $\mathcal{H}_{kq}$ $(\alpha_{kq}, p_q)$. This is because some forms of intereference whitening can cause the true aperture vector to be canceled in the estimator derived from a naive implementation of maximum likelihood estimation.

For simplicity we refer to the parameterized aperture vector as $h = \mathcal{H}_{kq}(\alpha_{kq}, p_q)$. If we subsume all the other reflectors/receivers/transmitters associated with the other q indices into the interference vector, from Equation (2) into an interference vector, a narrow band channel receiver model can be written for the aperture vector as, $$x(n) = h s(n) + i(n).$$

From this we can consider several different aperture noise models.

Additive Gaussian Noise

This model simply adds Gaussian noise to the true aperture $h_t$, $$h = h_t + e,$$

where e is colored Gaussian complex noise. In general e may be dependent on the unknown parameters $\alpha_{kq}$, $p_q$. It can be useful to consider a piecewise approximation of the e noise parameters for use in Bayesian estimation. In particular we could presume that the covariance matrices are dependent on an index that is unique to a given region or assumption about the nuisance parameters.

The whitened least squares estimators suggested by Equation (5) and Equation (7) are conducive to analyzing aperture noise models under the assumption that they are Gaussian.

Multiplicative Aperture Noise

The channel may be subject to phase noise due to oscillator imperfections. This is often modeled as multiplicative noise. In this case we would model the channel as, $$h = h_t \odot (1+e),$$

where $\odot$ represents elementwise multiplication and e is colored Gaussian complex noise.

One approximation subsumes this noise model into the simpler noise model of the Additive Gaussian Noise, with e replaced with $h_t \odot e$, another treats this model by an aperture square gain term added to the diagonal of the interference covariance matrix, further multiplied by relative phase noise power.

A more constrained approach to aperture noise allows a noise multiplier for each spread frequency. So for frequency k we model the receiver channel as an $M_k \times 1$ vector, $$\tilde{h}_k \alpha_k,$$

where $\tilde{h}_k$ is a possibly whitened component of the channel seen at frequency k across all receivers. The receiver model can be written as, $$\tilde{x}_k = \tilde{h}_k \alpha_k + e_k$$

$$\alpha_k = 1 + \varepsilon_k.$$

Here, $\tilde{x}_k$ is the whitened received data, in the form of an estimated channel response, playing the role of $\hat{h}_k$ in Equation (7).

Assuming a complex Gaussian noise model we have, $$P(\tilde{x}_k, \alpha_k \mid \tilde{h}_k) = \frac{1}{\pi^{M_k} \sigma^{2M_k} \beta_k^2} \exp\left(-\frac{1}{\sigma^2}\|\tilde{x}_k - \tilde{h}_k \alpha_k\|^2 - \frac{1}{\beta_k^2}|\alpha_k - 1|^2\right). \quad (8)$$

Here $\sigma^2$ is the variance of the additive white Gaussian noise (post whitening) and $\beta_k^2$ is the variance that controls the deviation of the per-frequency channel gain from unity. By varying $\beta_k^2$ we can express our confidence in the fidelity of the channel model. A large $\beta_k^2$ suggests that there is a lot of frequency dependent model error in the channel, perhaps due to phase noise arising from a stepped frequency tuner.

We can now integrate away the nuisance parameter representing the gain $\alpha_k$ to obtain, $$P(\tilde{x}_k \mid \tilde{h}_k) = \det(\pi R_{x_k x_k})^{-1} \exp(-(\tilde{x}_k - \tilde{h}_k)^H R_{x_k x_k}^{-1}(\tilde{x}_k - \tilde{h}_k)) \quad (9)$$

where $$R_{x_k x_k} = \sigma^2 I + \tilde{h}_k \tilde{h}_k^H \beta_k^2.$$

The posterior expectation for $\alpha_k$ and it's maximum likelihood estimate is given by, $$\hat{\alpha}_k = \frac{\beta_k^2 \tilde{h}_k^H \tilde{x}_k + \sigma^2}{\beta_k^2 \tilde{h}_k^H \tilde{h}_k + \sigma^2}.$$

It can be shown that to evaluate the argument in the exponential of Equation (9), it suffices to substitute $\hat{\alpha}_k$ into $\alpha_k$ in Equation (8). Also the determinant is easily computed as, $$\det(\pi R_{x_k x_k}) = \pi^{M_k}(\sigma^2 + \beta_k^2 \|\tilde{h}_k\|^2).$$

In the case that the multiplicative noise is applied over both antenna number and frequency number, we have the receiver channel vector modeled as, $$\tilde{x}_{mk} = \tilde{h}_{mk} \alpha_{mk} + e_{mk},$$

where m is the antenna index and k is the frequency index. This model leads to the conditional distribution of, $$P(\tilde{x} \mid \tilde{h}_k) = \det(\pi R_{x_k x_k})^{-1} \exp(-(\tilde{x}_k - \tilde{h}_k)^H R_{x_k x_k}^{-1}(\tilde{x}_k - \tilde{h}_k)),$$

where $$R_{x_k x_k} = \sigma^2 I + L(|\tilde{h}_k|^2) L(\beta_k^2),$$

where $L(|\tilde{h}_k|^2)$ is an M×M diagonal matrix, whose m'th diagonal element is $|\tilde{h}_{mk}|^2$ and $L(\beta_k^2)$ is a diagonal matrix whose m'th diagonal element is $\beta_{mk}^2$, the variance of the gain multiplier $\alpha_{mk}$.

Multi-Target and Multi-Scatter Models

We now generalize the model of Mutiplicative Aperture Noise to deal with the narrow band antenna model in the presence of either multiple scatterers or multiple emitters. In this case we use the channel model proposed in Equation (6), $$x_k = H_k g_k + e_k \quad (10)$$

$$H_k = [h_{k1}, h_{k2}, \ldots h_{kQ}]$$

$$g_k = [\alpha_{k1}, \alpha_{k2}, \ldots \alpha_{kQ}]^T$$

$$g_k \sim N(1, R_{g_k g_k}),$$

where 1 is the all ones vector, and where we drop the $\tilde{\cdot}$ representation for whitened data, assuming that the data and channels have been whitened if needed. The q index is the scatterer index or emitter index.

From this model we obtain $x_k \sim N(H_k 1, R_{e_k e_k} + H_k R_{g_k g_k} H_k^H)$, so that we can write the likelihood function as, $$p(x_k \mid H_k) = \det(\pi R_{x_k x_k})^{-1} \exp(-(x_k - H_k 1)^H R_{x_k x_k}^{-1}(x_k - H_k 1))$$

$$R_{x_k x_k} = R_{e_k e_k} + H_k R_{g_k g_k} H_k^H.$$

The mixture model in Equation (10) is very suggestive of multi-user detection (MUD). Indeed either successive interference cancellation (SIC) or parallel interference cancellation (PIC) are viable techniques for separating each superimposed channel vector. The fact that these vectors are parameterized by only a few position and gain parameters means that it is possible to separate them using their positions and delays as a filter. Typically the processing will keep a set of parameters associated with a given emitter/scatterer. These parameters can be used to generate associated channel vectors and thus to cancel them from the current environment using SIC or PIC. The positions parameters are then re-estimated for each active scatterer and that enables the process to repeat so that the cancellation can improve iteratively.

Note also that one can treat one of the "scatterers" as the static background field. It can be canceled from the environment using the same MUD techniques if one wants the processing to only focus on time varying phenomenon.

Multi-Aperture Target and Phase Normalization

The Multi-target signal model in Equation (10) can be used as a basis for a more complex and accurate target model. The receiver can be modeled as, $$x_k = a_k + u_k,$$

$$a_k = \sum_{q=1}^{Q} h_{kq} \alpha_{kq} = H_k g_k,$$

where the target channel $\alpha_k$ is seen as a mixture of multiple related component channels, (e.g. a human body with torso and limbs). The $u_k$ vector is presumed to be the stationary background clutter. For simplicity one can presume that the coefficients are Gaussian distributed, as is the background clutter with, $$g_k \sim N(\bar{g}_k, R_{gg})$$

$$u_k \sim N(\bar{u}_k, R_{uu}).$$

The probability for the signal on and signal off are, $$p(x_k \mid ON) = N(x_k - H_k \bar{g}_k - \bar{u}_k, H_k R_{gg} H_k^H + R_{uu})$$

$$p(x_k \mid OFF) = N(x_k - \bar{u}_k, R_{uu}),$$

from this one can compute the posterior probability of the target present (ON) and target not present (OFF), $$p(ON \mid x_k) = \frac{p(x_k \mid ON)p_1}{p(x_k \mid ON)p_1 + p(x_k \mid OFF)p_0},$$

where $p_1$ is the prior probability of the target being present and $p_0 = 1 - p_1$.

An additional modification to our model is to allow the removal of bulk phase terms for each channel component. Thus we have, $$x_k = \sum_{q=1}^{Q} h_{kq} \alpha_{kq} c_q + u_k,$$

where $c_q$ is a unit modulus phase equalization term. This is often necessary for smaller wavelengths, wherein the bulk phase can change rapidly over small changes in the target position.

One can use successive interference cancellation (SIC) or parallel interference cancellation techniques to learn $c_q$, simply by rewriting, $$x_k - \sum_{q \neq p} h_{kq} \alpha_{kq} c_q - u_k = h_{kp} c_p$$

$$\hat{c}_p = \text{sgn}\left(h_{kp}^H \left(x_k - \sum_{q \neq p} h_{kq} \alpha_{kq} c_q - u_k\right)\right),$$

$$\text{sgn}(u) \equiv \frac{u}{|u|}.$$

Finally, one can use similar techniques to add and subtract channel vectors from the collection that defines a target. The channels that have the lowest gain parameters can be dropped and a new channel can be added near to the canceled signal, $$h_p \approx x_k - \sum_{q \neq p} h_{kq} \alpha_{kq} c_q - u_k.$$

We either pick $h_p$ as part of the calibrated array manifold or simply as a raw data estimate.

Position/Parameter Uncertainty

Each channel vector has a dependency on it's position and other extraneous parameters, $h_{kq}(p_q, u)$. It is of interest to presume that there is some uncertainty with regards to these parameters. For example u may contain the positions of the receiver antennas, whilst $P_q$ may contain the uncertain scatterer/emitter positions. We may assume or estimate priors for these parameters, $p_q \sim f(p_q)$ and $u \sim g(u)$. If these prior distributions are Gaussian, then we have, $p_q \sim N(p_{0q}; R_p)$ and $u \sim N(u_0, R_u)$. Defining the real multivariate normal distribution by $\mathcal{N}(\alpha, R) \equiv \det(2\pi R)^{-1/2} \exp(-\frac{1}{2} \alpha^T R^{-1} \alpha)$, we can write the likelihood function as, $$p(x_k, p_0, p, u) = p(x_k \mid H_k) \mathcal{N}(u - u_0, R_u) \prod_{q=1}^{Q} (\mathcal{N}(p_q - p_{0q}, R_p) p(p_{0q})).$$

Using Bayes theorem we can write out the posterior distribution as, $$p(p_0 \mid x_k) = \frac{\int_{p_1} \int_{p_2} \cdots \int_{p_Q} \int_u p(x_k, p_0, p, u)}{\int_{p_1 p_{01}} \int_{p_2 p_{02}} \cdots \int_{p_Q p_{0Q}} \int_u p(x_k, p_0, p, u)}. \quad (11)$$

While we do not have a closed form solution for the posterior distribution we can use a Gaussian mixture model and importance sampling to produce a close approximation to it. These techniques are discussed in more detail in Gaussian-Mixture-Filter, herein.

Range Filtering

For many of the applications it is possible to know the precise timing of the transmit waveform. This is true for example for radar applications or for global position systems, or possibly cellular broadcast channels. This permits the receiver to filter signals based on their range by exploiting the time delay of arrival. This is useful for removing unwanted multipath and other types of co channel interference.

Consider the narrow band model where the signal is received at multiple frequencies indexed by k. At the receiver's m'th antenna we might see a signal of the form, $$x_{km} = h_{km} e^{-2\pi j f_k \tau_m} + i_{km},$$

where $\tau_m$ is the signal delay seen at antenna m, and where $f_k$ is the signal frequency for index k. We perform an inverse discrete Fourier transform, $\mathcal{D}^{-1}$ and obtain, $$\mathcal{D}^{-1}(x_{km}) = \sum_{k=0}^{K-1} e^{2\pi j f_k t} x_{km} = \sum_{k=0}^{K-1} h_{km} e^{2\pi j f_k (t - \tau_m)} + \sum_{k=0}^{K-1} e^{2\pi j f_k t} i_{km}.$$

If its assumed that the frequency hopping is linear $f_k = f_0 + k\Delta$, and that $h_{km} \approx h_m$ is dominated by a frequency independent mode, we then have, $$\mathcal{D}^{-1}(x_{km}) = h_m e^{2\pi j f_0 (t - \tau_m)} \frac{e^{2\pi j K \Delta(t - \tau_m)} - 1}{e^{2\pi j \Delta(t - \tau_m)} - 1} + \tilde{i}_{km}$$

$$= h_m e^{2\pi j \left(\left(f_0 + \frac{K-1}{2} \Delta\right)(t - \tau_m)\right)} \frac{\sin\left(\frac{K\Delta}{2}(t - \tau_m)\right)}{\sin\left(\frac{\Delta}{2}(t - \tau_m)\right)} + \tilde{i}_{km}.$$

One can plot what the simple delay channel looks like in the time domain. Here assuming K=128, $\Delta$=20 MHz and $\tau_m$=5 ns, we plot the impulsive response in FIG. 5.

As the number of frequencies K→∞, the time response would approach an impulse function. For an emitter/reflector that has an approximate known range, ie during tracking, it would be possible to use it's round trip or total delay to filter out unwanted multipath or interfering signals.

The required processing is illustrated in FIG. 6. The time window represents a filtering operation in the time domain wherein only certain delays are allowed through the filter. This is approximately equivalent to convolving with a sinc( ) function in the frequency domain.

The time delay filtering concept in FIG. 6 can also be used to detect a new object or transmitter in the field of view. One sweeps over allowed time delays and then detects any changes in the received channel vector.

Note for other system paradigms such as multi-transmitter geolocation, such as global positioning systems (GPS), one can do time delay filtering simply by limiting the lags of the spreading code correlators to a predetermined range.

Parameter Estimation and Tracking

One primary tool, used in one or more embodiments, for estimating free parameters is Bayesian estimation. It has the feature of providing both asymptotically optimal estimates of our parameters and also provides post estimation error bounds. Bayesian estimation techniques have been given a large boost by Markov Chain Monte Carlo methods, importance sampling and particle filters, since these techniques do not require the evaluation of intractable integrals. Furthermore the particle techniques do not require the computation of derivatives, or sequential optimization and are particularly suited for multiprocessor computation, either on a multi-core processor or an embedded graphics processing unit (GPU).

Gaussian Mixture Particle Filters

A particularly simple and efficient particle filter technique involves using a Gaussian or Gaussian mixture density as a prior to generate a lot of random points. Those points are then weighted by the conditional distribution, to then obtain a Gaussian mixture posterior estimate. The technique can use a simple Gaussian, or to approximate more complex priors we can use Gaussian mixtures.

While most of the prior art deal with dynamic systems and therefore update their particles/points using the system model, we are initially concerned with simply estimating the posterior distribution from our set of random guesses (aka particles) generated by our priors. Our notation below, drops the tilde for simplicity, but the received data and channel models could, without loss of generality, be whitened to make them interference resistant.

Bayes theorem for computing the posterior distribution can be written as, $$p(p \mid x) = \frac{p(x \mid p)p(p)}{\int p(x \mid p)p(p)dx}, \quad (12)$$

where x is the received data estimate of the channel, and p is the parameter vector containing the location and occurs in the estimator as the argument of h(p), the channel vector model. If the number of received antennas is a constant M for each channel number k, then x and h are of dimension MK. One possible example of a likelihood function can be derived from Equation (9), $$p(x \mid p) = \prod_{k=1}^{K} \det(\pi R_{x_k x_k}(p))^{-1} \exp(-(x_k - h_k(p))^H R_{x_k x_k}^{-1}(p)(x_k - h_k(p))),$$

where, $$R_{x_k x_k}(p) \equiv \sigma^2 I + h_k(p)h_k^H(p)\beta_k^2.$$

As can be seen it might be very difficult to optimize the conditional likelihood function using ordinary techniques due to it's complex dependency on p.

Define the real multivariate Gaussian probability density function as, $$\mathcal{N}(p;R) = \det(2\pi R)^{-1/2} \exp(-\tfrac{1}{2} p^T R^{-1} p).$$

One can propose to model the prior and posterior probabilities as a Gaussian mixture. The prior is assumed to adhere to, $$p_0(p) = \sum_{j=1}^{J} \eta_j \mathcal{N}(p - m_j; R_j),$$

where $\Sigma_j \eta_j = 1$. One can now propose the following algorithm to update our Gaussian mixture so that it approximates the posterior probability given in Equation (12) with $p(p) = p_0(p)$.

Gaussian Mixture Filter Update

1. Sample N random points from the Gaussian mixture prior $p_0(p)$, $p_n$.
2. Compute the conditional likelihood function over all the random points, $$\lambda_n = p(x \mid p_n).$$

3. Normalize the likelihoods to sum to one, $$\lambda_n \to \lambda_n / \sum_n \lambda_n$$

4. Resample a subset of Q<N points from the original N, where the probability of choosing $p_n$ equals $\lambda_n$. Call this set of renumbered points $p_{v(q)}$ for subindex q and the associated original index, n=v(q).
5. Use the EM algorithm, and the points $p_{v(q)}$ to learn a new set of $n'_j$, $m'_j$ and $R'_j$ to fit the set of sampled $p_{v(q)}$ points, q=1 ... Q.

We now delve into some of the details of the algorithm.

Sampling the Mixture and Resampling

For a given mixture probability of the form, $$p_0(p) = \sum_{j=1}^{J} \eta_j f_j(p),$$

we can generate N pseudo-random samples from any such distribution for which we can sample directly from $f_j(p)$. For each n we randomly select what category j, $p_n$ will belong to, based on the category probabilities $\eta_j$. Selecting the category can be done in approximately o(log(J)) comparisons by using a binary search into the cumulative sum array of $\eta_j$, namely $\varsigma_j = \Sigma_{q=1}^{j} \eta_j$. When a uniform random variate u is chosen, we need merely find j such that, $\varsigma_{j-1} \leq u < \varsigma_j$, using binary search, and initializing $\varsigma_0 = 0$.

Once the category is chosen for a given n, we generate a random sample using the pdf $f_j(p)$. For example when $f_j(p) = \mathcal{N}(p - m_j; R_j)$, we can sample from any given multivariate Gaussian distribution by setting $$p_m = m_j C_j^T e_n,$$

where $e_n$ is the n'th, generated unit variance Gaussian random vector with independent components, each component selected according to any number of standard proceedures for generating Gaussian samples e.g. the ziggurat method. Here the $C_j$ matrix is the upper Cholesky factor of the positive definite covariance matrix $R_j$. These computations are highly amenable to parallel processing as well After this we choose to sub-sample our original large sample of N points in proportion to the likihood $$\lambda_n = \frac{p(x \mid p_n)}{\sum_n p(x \mid p_n)}.$$

Again we can compute a cumulative sum of the likelihoods $v_n \equiv \Sigma_{q=1}{}^n \lambda_n$, followed by a binary search to find a n where a given, newly generated random uniform variable $u_q$ satisfies, $v_{n-1} \leq u < v_n$. This is our n=v(q).

Let us compute the probability distribution for $p_{v(q)}$. We have, $$p(p_{v(q)} = p \mid x) = \sum_{n=1}^{N} p(p \mid n = v(q), x, p_n = p) p(n = v(q) \mid x, p_n = p)$$

$$= \sum_n p_0(p) \lambda_n \mid (x, p_n = p)$$

$$= \sum_{n=1}^{N} \frac{p(x \mid p) p_0(p)}{\sum_{\substack{q \neq n}} p(x \mid p_q) + p(x \mid p)}$$

$$\approx \frac{\sum_{n=1}^{N} p(x \mid p) p_0(p)}{N \int_p p(x \mid p) p_0(p) dp}$$

$$= \frac{p(x \mid p) p_0(p)}{\int_p p(x \mid p) p_0(p) dp}$$

$$= p(p \mid x).$$

We have $\Sigma_{q \neq n} p(x|p_q) + p(x|p) \approx N \int_p p(x|p) p_0(p) dp$, by the law of large numbers, i.e. the sample mean approaches the expected mean as the number of independent samples N, approaches infinity, and p is also chosen independently. This shows that the conditional distribution of $p_{v(q)}$ asymptotically approaches our desired posterior distribution. In what follows we label the resampled points as $p_{v(q)} \rightarrow p_q$.

Expectation Maximization Algorithm

The Expectation Maximization (EM) algorithm can be used to learn the free parameters of a Gaussian mixture model, from collected data. In Samling the Mixture and Resampling it was showed how to approximately sample from the posterior distribution given an arbitrary likelyhood function. Thus this is the final step needed to update the parameters associated with the posterior distribution p(p|x).

The Gaussian mixture model for the posterior distribution will take the form, $$p_1(p \mid m, R) = \sum_{j=1}^{J} \pi_j N(p - m_j; R_j).$$

The initial values for $\pi_j$, $m_j$, and $R_j$ are chosen to be the same as the prior. The EM algorithm consists first performing the expectation of the logarithm of the conditional distribution $p_1(p|m,R)$, which is a lower bound to the original function followed by a maximization of this lower bound over the unknown parameters $m_j$ and $R_j$, to find the next iterate. This can be summarized as provided below.

Expectation Step

Compute the posterior likelihood of a sampled point $p_q$ being in category j, $$\gamma_{qj} = \frac{\pi_j N(p_q - m_j, R_j)}{\sum_{k=1}^{J} \pi_k N(p_q - m_k, R_k)} \quad (13)$$

$$N_j \equiv \sum_{q=1}^{Q} \gamma_{qj}.$$

The parameter $N_j$ can be thought of as the expected number of points associated to category j. Note $\Sigma_j N_j = Q$.

Maximization Step

The updated mixture parameters are given by, $$m_k^{new} = \frac{1}{N_k} \sum_{q=1}^{Q} \gamma_{qk} p_q$$

$$R_k^{new} = \frac{1}{N_k} \sum_{q=1}^{Q} \gamma_{qk} (p_q - m_k^{new})(p_q - m_k^{new})^T$$

$$\pi_k^{new} = \frac{N_k}{Q}.$$

The Expectation and Maximization steps are performed repeatedly until the log-likelihood function increase is below a predefined threshhold. The log likelihood function is defined as, $$L = \sum_{q=1}^{Q} \log\left(\sum_{j=1}^{J} \pi_j N(p_q - m_j; R_j)\right).$$

The form of EM algorithm suggests a modification that potentially allows one to skip the resampling component of Sampling the Mixture and Resampling. Using the original sampling of $p_n$ drawn from the prior distribution, modify (13) to read, $$\gamma_{nj} = \frac{\pi_j N(p_n - m_j, R_j) p(x \mid p_n)}{\sum_{k=1}^{J} \pi_k N(p_n - m_k, R_k) p(x \mid p_n)}.$$

This causes a given $p_n$ to be directly weighted by it's likelihood function.

Geolocation and Tracking

We can use our Bayesian particle filter techniques to facilitate both geolocation and tracking. For a single target objective we can use Equation (9) as an objective function to perform an initial maximization over position to find p. The position parameter enters the equation through the channel model h(p).

Dynamic Models

One simple way to approach dynamic models, is to simply re-estimate changing parameters and allow them to deviate from their current values at each look at the environment. This can be accommodated by our Bayesian approach, simply by bounding the variance of the parameter of interest from below. So for example if ρ(p|x) is the posterior distribution of position parameter p given the observed data x, after many observations we might have, $$p_N(p \mid x) = \prod_{q=1}^{N} \rho(p \mid x_q)$$

$$= \rho(p \mid x_N) p_{N-1}(p \mid x).$$

We then can exponentially devalue stale information by updating in the log-domain, $$\log(p_N(p|x)) = \log(p(p|x_N)) + \lambda \log((p_{N-1}(p|x)) + c,$$

where $0 < \lambda < 1$ and c is a normalization constant so that $p_N(p|x)$ integrates to 1. The exponential average puts a lower bound on the variance, which would tend towards zero if all the prior information was weighted equally. This has the effect of allowing a search over the parameter space in the vicinity of the current optimal p, with enough variance so that p can change according to system dynamics. This model works well for slow moving reflectors/emitters.

Another approach for system dynamics is to assume that p adheres to a first order discrete constant velocity model, ie $$p_N = p_{N-1} + v.$$

The model then seeks to learn v and to update $p_N$ based on the observed statistics. Again we can limit the variance for estimating v so that we can allow the acceleration to change slowly over time.

Every emitter q in the environment, will have an associated set of parameters that will need to be tracked and maintained, aka $p_q$. Moreover for some systems, e.g. detecting hand gestures, there may be multiple emitters/reflectors associated with the same target, ie a hand arm and human body. Emitters and reflectors can typically be associated by position over time relative to one another. We can use machine learning techniques to associate such objects and to classify their trajectories using channel vectors as the training data. A Bayesian belief network is a good model for this.

Detecting Environment Changes

During normal operation of any proposed sensor device, the environment may be quasi-stationary. Many applications require detection of moving or living objects and thus are improved by removing stationary objects. To this end we can consider a hypothesis channel model of the form, $$x_{off} = u + e_0$$

$$x_{on} = u + h + e_1,$$

where the channel vectors are stacked over all spread frequencies/look indices and have length MK elements, where u is the stationary receive vector due to either stationary emitters or stationary scatterers, $e_1$ is the noise vector for the new signal present case, $e_0$ is the signal off noise, and h is the channel vector for a new or moving emitter.

Because we continuously monitor the array we can learn an approximate prior distribution for u and h wherein u~N $(\bar{u}, R_{uu})$ and h~N $(\bar{h}, R_{hh})$. The statistics of u can be updated over each quiescent period. Suppose that we receive new data x. It is apparent that the conditional likelihood of x given OFF or ON, can be written as, $$p(x,u|ON) = N(x-u-\bar{h}, R_{hh} + R_{ee}) N(u-\bar{u}, R_{uu})$$

$$p(x,u|OFF) = N(x-u, R_{ee}) N(u-\bar{u}, R_{uu}).$$

After integrating out u one obtains, $$p(x|ON) = N(x-\bar{h}-\bar{u}, R_{uu} + R_{hh} + R_{ee})$$

$$p(x|OFF) = N(x-\bar{u}, R_{uu} + R_{ee})$$

From this we can see that the posterior probability of x adhering to the ON model is, $$p(ON|x) = \frac{N(x-\bar{h}-\bar{u}, R_{uu} + R_{hh} + R_{ee})p_1}{N(x-\bar{h}-\bar{u}, R_{uu} + R_{hh} + R_{ee})p_1 + N(x-\bar{u}, R_{uu} + R_{ee})p_0},$$

where $p_1$ is the prior probability that we see a new signal arriving and $p_0 = 1 - p_1$. In general the distribution for h will be a Gaussian mixture, conditioned on the current set of captured targets and the possibility of a new acquisition. Thus we may choose to further condition the distribution on a category k, that defines the existing tracked targets plus an additional zero mean distribution for an unknown new target.

We also need to compute the posterior distribution for u so that we can update it's statistics. We have, $$p(u|x, ON) = N(\bar{u}_1, R_{11}),$$

$$\bar{u}_1 = \bar{u} + R_{uu}(R_{uu} + R_{hh} + R_{ee})^{-1}(x - \bar{u} - \bar{h})$$

$$R_{11} = R_{uu} - R_{uu}(R_{uu} + R_{hh} + R_{ee})^{-1} R_{uu};$$

$$p(u|x, OFF) = N(\bar{u}_0, R_{00}),$$

$$\bar{u}_0 = \bar{u} + R_{uu}(R_{uu} + R_{ee})^{-1}(x - \bar{u})$$

$$R_{00} = R_{uu} - R_{uu}(R_{uu} + R_{ee})^{-1} R_{uu}.$$

The preferred modality is to update only when the OFF state is detected. Note also the similarity of these updates to the Kalman filter. The latter has a close relationship to Bayesian inference, when the distributions in question are normally distributed.

Shape and Gesture Identification

Suppose that a target has a collection of emitters/scatterers associated with it $h_q$, $q \in \mathcal{T}$ where e is a target index and $\mathcal{T}$ is a set of scatterers associated with a given target. The shape identification problem is to identify the set of channel vectors $h_q$ that correspond to a shape category $c_e$. The identification problem also often has a time dependency, so that one typically makes an identification over a time period $t \in [r-T, \tau]$. An example of this would be say a human hand making a right circular motion. To identify this, we require data over a period of time long enough to verify that it is a circular motion in the right direction.

Mapping a set of channel vectors to a shape is a good candidate for machine learning and using a Bayesian belief network. The training process in learning and identifying targets is part of the calibration process for the array. Each target will have very different spatial signatures, especially after the target is observed over time. The category associated with a target's shape, the target's orientation as well as it's position are all candidate parameters for learning within the p vector of the overall parameter estimation problem.

While the data set is large, the identification problem can often be broken down into a set of smaller more reasonable steps. For example we can consider the problem of detecting a human hand wave. If we model body parts as cylinders, we need to find a cylinder "object" making changes in the elevation coordinate, or more precisely a cylinder that is rotating about an axis in the x-y plane. The gesture detection problem is roughly outlined in FIG. 7.

The initial state occurs when the target of interest appears stationary or has not yet entered the field of view. Once motion is detected via the techniques in Detecting Environment Changes we then use Bayesian inference to detect the object location, it's orientation and object shape using the Bayesian inference techniques of Gaussian Mixture Pareticle Filters and Geolocation and Tracking.

For the gesture detection we pay attention to it's orientation and it's elevation coordinate. After two changes in elevation coordinate we can presume that the object is waving. Not shown in FIG. 7 are all the possible transitions to the stationary state, which can happen after a time-out period in any give state. When the hand wave gesture is detected, that can be reported to the overall system controller.

Many other gestures and motion detection schemes can be broken up into discrete steps, whose transitions can be appropriately detected by Bayesian inference and machine learning in general. It is important for us to work directly with the channel vectors, since this gives us the optimal theoretical estimation and detection performance.

Using HOSVD in Machine Learning

Creating a neural network, Bayesian network or other machine learning structure, allows one to learn an arbitrary nonlinear function through a controlled data structure. An example of such a structure is provided in FIG. 8.

In this directed graph each node represents a computation. For a Bayesian network the graph represents conditional dependency and each edge is weighted by the conditional probability, and the nodes represent a sum of products whose output is the posterior probability, ie for node k, $$p_k = \sum_{j \in par(k)} p_{k|j} p_j.$$

The initial probabilities and conditionals are possibly dependent on the received input data and par(k) is the set of nodes which are parents of node k in the directed graph.

For a neural network the weights on each edge multiply the values at the nodes are summed and then passed through a nonlinear function to obtain the node output, $$x_k = f\left(\sum_{j \in par(k)} w_{kj} x_j\right).$$

The machine learning literature contains many techniques for learning the weights and the structure of these networks in an attempt to match an arbitrary nonlinear function.

We introduce here a new approach that exploits the structure compression properties of higher order singular value decomposition. In FIG. 9 we show that the HOSVD network is essentially a one layer network that learns a set of eigen-functions (the $f_{kj}$) and some multipliers to approximate the nonlinear function of interest. The functions are multiplied and then summed to obtain the final function value via, $$f(x_1, x_2, \ldots, x_I) \approx \sum_q \sigma_q \prod_i f_{qi}(x_i).$$

The number of branches required to approximate most functions is significantly smaller than the requirement to tabulate the multivariable function. For example, when we look at HOSVD decompositions for Green function kernels in Basis Functions and HOSVD and Equation (31) we find only a tiny fraction of the singular values are significant as FIG. (11) shows.

Thus there may be significant computational savings in using this flattened structure, once the individual eigenfunctions are approximated by splines. This structure provides an innovative way of implementing many of the machine learning networks and for approximating the many functions used in partial differential equation boundary value problems, such as the Helmholtz wave equation for electromagnetic propagation.

Channel Modeling

A key component of this invention is the ability to successfully model the electro-magnetic channel seen by our receivers. Particularly challenging is the problem of electromagnetic scattering. We propose a series of approximations to the scattering problem that exploit known geometries and some novel expansions of the electromagnetic reproducing kernel.

Our goal is to create a series of basis functions that can be used to calibrate our receiver array in the presence of various scattering objects. These functions can also be used to interpolate our scatterers over differing range and angle of arrival values.

Electro-Magnetic Scattering

For our calibration model, we desire to pick a set of basis functions that match the electromagnetic environment of the receiver. This is especially important for nearby scatterers for radar applications. There are some applications that require us to model a sizeable reflector within a few feet of the transmitter. For example for security purposes we might want to differentiate between an animal or human reflector, or we may want to detect hand or arm gestures or detect the presence of a forklift entering a warehouse etc.

For this reason we need to extend the emitter model beyond that of a point source. If we model the scatterer as a parameterized surface that admits a local orthogonal coordinate system, we can exploit a type of Green's theorem to model an electromagnetic field as a function of the field parameters on the distant closed surface. Indeed it is well known that the wave equation has a reproducing kernel, similar to Cauchy's theorem in complex analysis.

In the geometric Clifford algebra $Cl_{0,3}$, the microscopic Maxwell's equations can be written as, $$\left(\frac{1}{c}\partial_t + D\right)F = \frac{1}{c\varepsilon_0}(c\rho - j), \tag{14}$$

where c is the velocity of light, $\partial_t$ is the partial derivative operator with respect to time, $D \equiv e_1 \partial_x + e_2 \partial_y + e_3 \partial_z$ is the Dirac operator, $F \equiv E + icB$ is the electromagnetic field vector (or Faraday vector), $\rho$ is the charge density and j is the current density vector. A vector is expressed by $v \equiv \sum_{k=1}^{3} v^k e_k$, and the coordinate vectors $e_k$ have an associative product that has the properties $e_q e_m = -e_m e_q$ for $q \neq m$ and $e_q^2 = 1$. The pseudoscaler $i \equiv e_1 e_2 e_3$ commutes with the $e_k$ and has the structural property $i^2 = -1$.

A product of vectors in the geometric algebra includes both the inner product and the cross product via the formula, $$ab = a \cdot b + ia \times b.$$

Because of this it is possible to express Maxwell's equations in the concise expression 14. In a region of no sources, and assuming the time dependency is harmonic, of the form $\exp(2\pi jft)$, we see that the electromagnetic field vector satisfies the Helmholtz equation, $$DF = -jkF,$$

where the wavenumber $$k = \frac{1}{c} 2\pi f.$$

Note that the j used here is a square root of −1 for tracking phase changes for a complex phasor at frequency f, which is different from the pseudoscalar i. An important property of the Dirac operator within a Clifford algebra is the fact that, $D^2 = \partial_x^2 + \partial_y^2 + \partial_z^2$ is the scalar Laplace operator of the standard wave equation.

The Cauchy integral formula for our Geometric algebra can be written in general by, $$\int_{\partial R} h dx^* g = \int_R ((hD)g + hDg) dV, \quad (15)$$

where $dx^* \equiv dydze_1 - dxdze_2 + dxdye_3 = \Sigma_k dx^*_k e_k$, and •* is the Hodge star operator, R is a volume in three space and $\partial R$ is the boundary of the volume. The vector form dx* will be normal to any parameterized surface. In (15) if we substitute h→b and g→Da, we get, $$\int_{\partial R} b dx^* Da = \int_R ((bD)Da + bD^2 a) dV.$$

Similarly if we substitute h→bD and g→a we get, $$\int_{\partial R} bD dx^* a = \int_R ((D^2 b)a + DbDa) dV.$$

Subtracting these two equations yields a second order Green's formula, $$\int_{\partial R} (bD dx^* a - b dx^* Da) = \int_R ((D^2 b)a - bD^2 a) dV.$$

Note that it is possible to extend both the Cauchy equation and Green's formula to the time harmonic case, addressing the Helmholtz equation. This is simply a matter of adding and subtracting the eigen value, or simply letting them cancel out for the Green's function. We can thus write, $$\int_R ((h(D-jk))g + h(D+jk)g) dV = \int_{\partial R} h dx^* g, \quad (16)$$

$$\int_{\partial R} (b(D-jk) dx^* a - b dx^* (D-jk)a) = \quad (17)$$
$$\ldots \int_R (((D^2 + k^2)b)a - b(D^2 + k^2)a) dV.$$

Bicomplex Algebra

The addition of another commutative square root of negative one, j, for the purpose of tracking harmonic phase, causes the underlying geometric algebra to split into 2 isomorphic components. One component corresponds to outgoing waves with a wavenumber k, and the other to incoming waves with wavenumber −k. It also forces plane waves to decompose into right and left circular polarization.

The two algebras coincide with coefficients of either $\mathcal{O}_+ = \frac{1}{2}(1+ij)$, and $\mathcal{O}_- = \frac{1}{2}(1-ij)$. The algebra isomorphism is better understood by noting, $$\mathcal{O}_+ \mathcal{O}_+ = \mathcal{O}_+$$
$$\mathcal{O}_- \mathcal{O}_- = \mathcal{O}_-$$
$$\mathcal{O}_+ \mathcal{O}_- = 0$$
$$\mathcal{O}_+ + \mathcal{O}_- = 1$$
$$i\mathcal{O}_- - i\mathcal{O}_+ = j$$
$$\mathcal{O}_- e^{iwt} + \mathcal{O}_+ e^{-iwt} = e^{jwt}.$$

Thus, we can write the Clifford electromagnetic field as, $$F(k,r)e^{j\omega t} = \mathcal{O}_- F(k,r)e^{i\omega t} + \mathcal{O}_+ \overline{F}(k,r)e^{-i\omega t}$$
$$= \mathcal{O}_- F(k,r)e^{i\omega t} + \mathcal{O}_+ F(-k,r)e^{-i\omega t},$$

where the bar here is conjugation with respect to j. The j is replaced by i and it's conjugate in the split algebra. This isomorphism allows one to drop the additional j and implement the algebra in our calculations by tracking Clifford numbers for both $$k = \frac{2\pi\omega}{c}, \text{ and } -k \text{ or } \frac{-2\pi\omega}{c}.$$

One can recover the original representation by replacing,
$$\mathcal{O}_+ \to \frac{1}{2}(1+ij)$$
$$\mathcal{O}_- \to \frac{1}{2}(1-ij),$$

resulting in, $$F(k,r)e^{j\omega t} = \frac{1}{2}\left(F(k,r)e^{i\omega t} + \overline{F}(k,r)e^{-i\omega t}\right) + j\frac{1}{2}\left(F(k,r)e^{i\omega t} - \overline{F}(k,r)e^{-i\omega t}\right)$$
$$= (F_r + jF_i)e^{j\omega t},$$

where,
$$F_r = \frac{1}{2}(F(k,r) + \overline{F}(k,r))$$
$$F_i = \frac{1}{2}(F(k,r) - \overline{F}(k,r)).$$

Boundary Conditions

For the scattering problem it is important to understand electromagnetic boundary conditions. We presume linear media so that Equation (14) holds. In Equation (16) set h=1 and let g=F, the electro-magnetic field vector, so that (D+jk)

$$F = \frac{1}{c\varepsilon_0}(c\rho - j).$$

Let the volume of integration be an infinitely thin box that spans the boundary of two regions as shown in FIG. 10. Let A be the face of the box in free space and A' the region on the other side of the boundary surface. We thus have, $$\frac{A}{c\varepsilon_2}(c\rho_s - j_s) - \int_R jkF = \int_{\partial R} dx^* F$$
$$= \int_{\partial R} nFdS$$
$$= An(F_1 - F_2),$$

where $\rho_s$ is the surface charge density and $j_s$ is the surface current density and n is the outward facing normal from surface A in region 1 to the left, and is negative to the normal in region 2 to the right of the boundary. dS is the scalar area differential. Since F is piecewise continuous and the volume of R→0, we also have, $\int_R jkF \to 0$. The sides of the box shrink to 0 rapidly and don't contribute to the area integral. The A region is presumed small enough so that F is constant there.

In one fell swoop, this proves the electromagnetic boundary conditions, $$n(F_1 - F_2) = \frac{1}{\varepsilon_2}\rho_s - c\mu_2 j_s.$$

This shows in particular that, $n \times (E_1 - E_2) = 0$ $n \cdot (B_1 - B_2) = 0$ The tangential component of the electric field is continuous, as is the normal component of the magnetic field. We can project the Faraday vector on to it's tangential E component and normal B component via the surface projection operator, $Q_- F \equiv \frac{1}{2}(F + n\tilde{F}n)$, where ã is the principle involution defined by $\tilde{e}_k = -e_k$ for k=1 . . . 3, and $\tilde{a}\tilde{b} = \tilde{ab}$. Thus the continuity relations can be written as, $Q_-(F_1 - F_2) = 0.$ If you define the complementary projection operator onto the normal component of E by, $Q_+ F \equiv \frac{1}{2}(F - n\tilde{F}n)$, then we have on the surface, $$(Q_+ + Q_-)F = F$$
$$Q_+^2 = Q_+$$
$$Q_-^2 = Q_-$$
$$Q_+(F_1 - F_2) = \frac{1}{\varepsilon_2}\rho_s n - c\mu_2 n \times j_s$$
$$= n\left(\frac{1}{\varepsilon_2}\rho_s - c\mu_2 j_s\right)$$

For a perfect conductor the surface current paravector $$K = \frac{1}{\varepsilon_2}\rho_s - c\mu_2 j_s,$$

can be found from the incident Faraday vector $F_0$ by, $K = 2\langle nF_0 \rangle_\mathcal{R}$, where $\langle a \rangle_\mathcal{R}$ is the real part of the Clifford number a with respect to the pseudoscalar $i = e_1 e_2 e_3$. Here the fields are evaluated at the surface of the conductor. We can also write down the reflected field from a perfect conductor as, $F_r(x) = -n\tilde{F}_0(n\tilde{x}n)n,$ Also of interest is the reversion involution defined by $(ab)^\dagger = b^\dagger a^\dagger$ and $e_k^\dagger = e_k$. Note that $\tilde{i} = -i$, and $i^\dagger = -i$. Also $\langle a \rangle_\mathcal{R} = \frac{1}{2}(a + a^\dagger)$. For non-deal conductors we will generalize this rule somewhat via an unknown reflection coefficient $\alpha$, so that, $F_r(x) = -\alpha n\tilde{F}_0(n\tilde{x}n)n$ \hfill (18)

The reflection coefficient $\alpha$ is allowed to be complex in j but not in i. These formulas require that the coordinate system is chosen so that the reflecting conducting plane passes through the origin. Otherwise we need to replace $n\tilde{x}n$ with $n(x-x_0)\tilde{\,}n + x_0$, for some $x_0$ on the reflecting surface.

This model yields the following surface current paravector (vector plus a scalar), $K = 2\langle nF_0 \alpha^\dagger \rangle_\mathcal{R}$ \hfill (19)

where $F_0$ is evaluated at the reflector surface. For monochromatic waves it suffices to evaluate the Faraday vector over a closed surface to determine it's radiated pattern throughout space. This makes Equation (19) particularly useful to determine the electromagnetic field, reflected off of arbitrary surfaces.

It can be shown that the reflected electromagnetic field vector in Equation (18) satisfies Diracs equation, $$\left(\frac{1}{c}\partial_t + D\right)F_r(x)e^{j\omega t} = 0,$$

since the reflection formula is in fact just an improper Lorentz transformation. We can use Equation (19) as an approximation for non-ideal conductors, wherein the complex reflection coefficient $\alpha$ is a property of the underlying material. Since $\alpha$ can be learned during calibration and estimated from the received data, changes in $\alpha$ can be attributed to changes in the underlying dielectric material of different objects. This has applications to medical imaging, where the dielectric may change as a result of sugar levels, or tumors and so forth.

The Reproducing Kernel

Consider the Helmholtz form of the Cauchy equation in (16). Suppose we can find a function h(x) in the geometric algebra that has the property that applying the right Helmholtz operator yields the Dirac delta function, $h(x-x_0)(D-jk) = \delta(x-x_0).$ Furthermore consider a Faraday vector g(x) satisfying the Helmholtz version of Maxwell's equation, $$(D + jk)g(x) = \frac{1}{c\varepsilon_0}(c\rho - j).$$

Substitution into (16) yields, $$\int_R \left(\delta(x - x_0)g + h(x - x_0)\frac{1}{c\varepsilon_0}(c\rho(x) - j(x))\right)dV = \int_{\partial R} h(x - x_0)dx^* g(x).$$

Assuming that $x_0$ lies in the spatial region R (possibly unbounded assuming decaying radiation conditions), we have, $$g(x_0) = \int_{\partial R} h(x - x_0)dx^* g(x) - \int_R h(x - x_0)\frac{1}{c\varepsilon_0}(c\rho(x) - j(x))dV.$$

For the case of no source charges or currents in the field of interest, we have an analogy to Cauchy's equation in complex analysis, $$g(x_0) = \int_{\partial R} h(x - x_0)dx^* g(x). \hfill (20)$$

The reproducing kernel for geometric algebra can be written as, $$h(x) = (D + jk)\frac{e^{-jkr}}{-4\pi r},$$

$$r \equiv \sqrt{x^2 + y^2 + z^2} = (xx)^{\frac{1}{2}}.$$

This can be written as, $$h(x) = \frac{-e^{-jkr}}{4\pi r}\left(jk - \left(jk + \frac{1}{r}\right)\frac{x}{r}\right) \quad (21)$$

$$x \equiv xe_1 + ye_2 + ze_3.$$

For the Green's theorem in (17), it is helpful to first define the Electromagnetic paravector potential as, $$a = cA - \phi,$$

where A is the electro-magnetic vector potential and where $\phi$ is the scalar potential. We also assume the Lorenz gauge which forces $$\left\langle \left(D - \frac{1}{c}\frac{\partial}{\partial t}\right)a \right\rangle_S = 0,$$

where $\langle \bullet \rangle_{R,S}$ is the scalar part of a Clifford number. This means, $$cD \cdot A + \frac{1}{c}\frac{\partial \phi}{\partial t} = 0.$$

Maxwell's equations now give us, $$\left(D - \frac{1}{c}\frac{\partial}{\partial t}\right)a = E + icB = F. \quad (22)$$

For the time harmonic case we get the Helmholtz version of this as, $$(D - jk)a = F$$

$$(D^2 + k^2)a = \frac{1}{c\varepsilon_0}(c\rho - j).$$

In Equation (17) we now use a as the electromagnetic paravector potential and b as a Green's function satisfying $(D^2+k^2)b\ (x-x_0)=\delta(x-x_0)$. This yields, $$\int_{\partial R} ((b(x-x_0)(D-jk))dx^*a(x) - b(x-x_0)dx^*F(x)) + \cdots$$

$$\int_R \frac{b(x-x_0)}{c\varepsilon_0}(c\rho(x) - j(x))dV = a(x_0).$$

It is customary to choose a Green's function that is constant or even zero on $\partial R$, however our typical use case evaluates the paravector potential at an arbitrary point $x_0$ in space, requiring our surface to vary with the choice of receiver location $x_0$. For this reason it suffices to simply choose the standard Green's function for the sphere, $$b(x-x_0) = \frac{-e^{-jkr}}{4\pi r},$$

$$r = \|x - x_0\|$$

from which we can obtain, $$h_-(x-x_0) \equiv b(x-x_0)(D-jk) = \frac{-e^{-jkr}}{4\pi r}\left(-jk - \left(jk + \frac{1}{r}\right)\frac{x - x_0}{r}\right). \quad (23)$$

In a region with no sources we can therefore write the reproducing kernel for the paravector potential as, $$a(x_0) = \int_{\partial R} (h_-(x-x_0)dx^*a(x) - b(x-x_0)dx^*F(x)). \quad (24)$$

Note also that if the region R is unbounded and that we assume a radiation decay condition that makes the surface integrals vanish, we obtain the usual time harmonic solution for the retarded potential, $$\int_R \frac{b(x-x_0)}{c\varepsilon_0}(c\rho(x) - j(x))dV = a(x_0).$$

Also note that the scalar potential can, in particular can be written as, $$\phi(x_0) = \int_{\partial R} \langle h_-(x-x_0)dx^*a(x) - b(x-x_0)dx^*F(x)\rangle_S.$$

Reproducing Kernel Channel Model and Surface Inference

The reproducing kernel formulas suggest a possible numerical model for the reflected waveform. We pick a hypothesized surface R centered on the reflector position p, and with boundary $\partial R$. Given a model for the electromagnetic field from the transmitter, we can compute the reflected field from Equation (18), based on the local normal to the surface $\partial R$, from this we can compute the field at the remote receiver antenna using one of the reproducing kernel formulas in Equation (20) and Equation (24).

We summarize this algorithm as provided below.

Reproducing Kernel Algorithm

1. Hypothesize a position p for the center of the emitter/reflector region R.

2. Compute a set of Faraday vectors for the reflected field $\alpha_q F_r(x_q) = -\alpha_q n_q \tilde{F}_0(p+r_q)n_q$, where $F_0(x)$ is the transmitted Faraday vector seen at position x, $n_q$ is the unit normal vector seen at position $x_q = p+r_q \in \partial R$.

3. Compute the Faraday vector at antenna position y using an approximation to the reproducing kernel formula, $$g(y_m) \approx \sum_q h(x_q - y_m)n_q \alpha_a F_r(x_q)A_q,$$

where $A_q$ is the area associated with the sampled surface point $x_q$.

4. Compute per antenna voltage $h_m \approx b_m \cdot E(y_m)$, where $b_m$ is the appropriate vector effective length for receiver antenna m, and $E(y_m)$ is the electric field component of $g(y_m)$. Computations can be reduced by bringing the E field projection and the inner product into the sum/integral, ie $$h_m \approx \sum_q \alpha_q A_q b_m \cdot \langle h(x_q - y_m) n_q F_r(x_q) \rangle_{\mathcal{R}\,RV},$$

where $\langle u \rangle_{\mathcal{R}\,RV}$ is the real vector part of u. Of course more sophisticated quadrature formulas can be used to obtain the integral approximation.

5. Use the computed channel vector $h_m$ as part of the Gaussian Mixture Filter Update algorithm from Gaussian Mixture Filter Update for estimating the reflector/emitter position p.

Another algorithm suggests itself from the form of the Reproducing Kernel Algorithm. It is theoretically possible to compute the contribution of all the nodes to the m'th antenna via, $$\vartheta_{mq} \equiv A_q b_m \cdot \langle h(x_q - y_m) n_q F_r(x_q) \rangle_{\mathcal{R}\,RV},$$

in advance after calibration. In this mode we would compute $\vartheta_{mq}$ over a dense grid $x_q$, indexed by q. Thus with the $\vartheta_{mq}$ pre computed we can write an approximation for the channel vector as, $$h_m = \sum_{q: x_q \in \partial R} \vartheta_{mq} \alpha_q. \qquad (25)$$

In this model we might consider the reflection coefficients $\alpha_q$ and even the boundary set $\partial R$ as free parameters, not to mention the implicit dependency on the surface normal unit vectors $n_q$. By making these parameters invariant or part of some constrained manifold we might actually be able to infer the boundary from the collection of the received data over time. Allowing the boundary to change permits us to possibly detect human gestures, breathing or more complex objects in the field. The free parameters can be added to the global invariant parameter vector p and optimized using Gaussian Mixture Filtering.

This suggests the algorithm as provided below.

Surface Inference Algorithm

1. Hypothesize a boundary region $\partial R$, containing a center as part of the parameter vector p.

2. Identify all nodes $q \in \partial R$ and compute or update the unit normal vectors $n_q$ if necessary, based on the shape of $\partial R$.

3. Compute $h_m = \sum_{q: x_q \in \partial R} \vartheta_{mq} \alpha_q$ and use it to compute the likelihood for use in (9) and the algorithm in the Gaussian Mixture Filter.

4. Use the Gaussian Mixture Filter algorithm to update the mixing gains $\alpha_q$ in a locally constrained manner (ie small variance), and use nearby q to determine if the bondary $\partial R$ should be updated if it achieves a better fit.

5. Test convergence if no improvement can be made in the likelihood, if not return to step 1.

Factoring Common Phase Center

For higher frequencies (larger k), spherical harmonics produce phase terms of the form $e^{-jkr}$, where r is the total distance traveled for the transmitted waveform (about twice the distance to the reflector). The $$\frac{e^{-jkr}}{r}$$

wave solution is always asymptotically true in the far field. Because r is usually much larger than the inter-element spacing of the array, in order to avoid floating point overflows or underflows it helps to factor out the phase response due to the center of the array.

Suppose the reflector is at position y and the center of the array is at $x_0$, which we also assume is the transmitter position for simplicity. Assume also that $x_m = x_0 + d_m$ is the position of receive antenna m. The total distance traveled to antenna m is, $$r_m = y_0 + \|x_0 - y + d_m\|.$$

The total distance to $x_0$ is, $$r_0 = 2 y_0$$
$$\equiv 2\|x_0 - y\|.$$

If we factor out the phase center we have the relative phase term, $$e_{rel} = e^{-jk(r_m - r_0)}.$$

But now we can write, $$r_m - r_0 = \|x_0 - y + d_m\| - y_0$$
$$= \frac{\|d_m\| \left( \frac{2 d_m}{\|d_m\|} \cdot (x_0 - y) + \|d_m\| \right)}{\|x_0 - y + d_m\| - y_0}.$$

The last expression avoids the loss of precision inherent in subtracting two large numbers $r_m - r_0$ in the phase response. These terms are inherent in all models of electromagnetic propagation, and it is often beneficial to work with the relative phase. Indeed one can smooth the array response by tossing away the bulk phase term $e^{-jkr_0}$ in the channel models via relative gain normalization.

Analytic Scattering Models

We now turn our attention to techniques which approximate the electro-magnetic field with analytic solutions using known functions or series of functions. We seek to obtain sets of basis functions that can be used to fit the scattering model at hand, usually as part of the calibration process.

We first look at some useful coordinate systems, whose level curves represent objects of interest. We also derive their Dirac operators.

Rectangular Coordinate System $$(x, y, z)$$
$$D = e_1 \frac{\partial}{\partial x} + e_2 \frac{\partial}{\partial y} + e_3 \frac{\partial}{\partial z}.$$

This coordinate system is good for representing rectangular surfaces and boxes.

Cylindrical Coordinate System $$x = \rho\cos(\theta)$$
$$y = \rho\sin(\theta)$$
$$z = z$$
$$\rho = \sqrt{x^2 + y^2}$$
$$\theta = \tan^{-1}\left(\frac{y}{x}\right)$$
$$z = z,$$
$$D = D\rho\frac{\partial}{\partial \rho} + D\theta\frac{\partial}{\partial \theta} + e_3\frac{\partial}{\partial z}$$
$$D\rho = \cos(\theta)e_1 + \sin(\theta)e_2$$
$$D\theta = \frac{-\sin(\theta)}{\rho}e_1 + \frac{\cos(\theta)}{\rho}e_2.$$

This coordinate system is good for representing cylindrical surfaces.

Spherical Coordinate System $$x = r\sin(\theta)\cos(\phi)$$
$$y = r\sin(\theta)\sin(\phi)$$
$$z = r\cos(\theta)$$
$$r = \sqrt{x^2 + y^2 + z^2}$$
$$\theta = \cos^{-1}\left(\frac{z}{r}\right)$$
$$\phi = \tan^{-1}\left(\frac{y}{x}\right)$$
$$D = Dr\frac{\partial}{\partial r} + D\theta\frac{\partial}{\partial \theta} + D\phi\frac{\partial}{\partial \phi}$$
$$Dr = \sin(\theta)\cos(\phi)e_1 + \sin(\theta)\sin(\phi)e_2 + \cos(\theta)e_3$$
$$D\theta = \frac{\cos(\theta)\cos(\phi)}{r}e_1 + \frac{\cos(\theta)\cos(\phi)}{r}e_2 - \frac{\sin(\theta)}{r}e_3$$
$$D\phi = \frac{-\sin(\phi)}{r\sin(\theta)}e_1 + \frac{\cos(\phi)}{r\sin(\theta)}e_2$$

This coordinate system is good for representing spheres.

Prolate Spheroidal Coordinate System $$x = a\sqrt{(\sigma^2-1)(1-\tau^2)}\cos(\phi)$$
$$y = a\sqrt{(\sigma^2-1)(1-\tau^2)}\sin(\phi)$$
$$z = a\sigma\tau,$$
$$\sigma = \frac{1}{2a}\left(\sqrt{x^2+y^2+(z+a)^2} + \sqrt{x^2+y^2+(z-a)^2}\right)$$
$$\tau = \frac{1}{2a}\left(\sqrt{x^2+y^2+(z+a)^2} - \sqrt{x^2+y^2+(z-a)^2}\right)$$
$$\phi = \tan^{-1}\left(\frac{y}{x}\right)$$
$$D = D\sigma\frac{\partial}{\partial \sigma} + D\tau\frac{\partial}{\partial \tau} + D\phi\frac{\partial}{\partial \phi}$$
$$D\sigma = \frac{x(r_+ + r_-)}{2ar_+r_-}e_1 + \frac{y(r_+ + r_-)}{2ar_+r_-}e_1 + \left(\frac{z(r_+ + r_-) - a(r_+ - r_-)}{2ar_+r_-}\right)e_3$$
$$D\tau = \frac{-x(r_+ - r_-)}{2ar_+r_-}e_1 + \frac{-y(r_+ - r_-)}{2ar_+r_-}e_1 + \left(\frac{-z(r_+ - r_-) + a(r_+ + r_-)}{2ar_+r_-}\right)e_3$$
$$D\phi = \frac{-\sin(\phi)}{a\sqrt{(\sigma^2-1)(1-\tau^2)}}e_1 + \frac{\cos(\phi)}{a\sqrt{(\sigma^2-1)(1-\tau^2)}}e_2,$$

where, $$r_+ \equiv \sqrt{x^2 + y^2 + (z+a)^2}$$
$$r_- \equiv \sqrt{x^2 + y^2 + (z-a)^2},$$

Prolate spheroidal coordinate systems are good for modeling an ellipse that has been rotated about the z-axis.

Confocal Ellipsoidal Coordinates

This confocal ellipsoidal coordinate system has level surfaces corresponding to ellipsoids when $\xi_1$ is constant, $$\frac{x^2}{a^2-\xi_1} + \frac{y^2}{b^2-\xi_1} + \frac{z^2}{c^2-\xi_1} = 1$$

hyperboloids of one sheet when $\xi_2$ is constant, $$\frac{x^2}{a^2-\xi_2} + \frac{y^2}{b^2-\xi_2} + \frac{z^2}{\xi_2-c^2} = 1$$

and hyperboloids of two sheets when $\xi_3$ is constant $$\frac{x^2}{a^2-\xi_3} + \frac{y^2}{b^2-\xi_3} + \frac{z^2}{\xi_3-c^2} = 1,$$

where we additionally require, $$\xi_1 < c^2 < \xi_2 < b^2 < \xi_3 < a^2.$$

Coordinates can be derived as, $$x^2 = \frac{(a^2-\xi_1)(a^2-\xi_2)(a^2-\xi_3)}{(a^2-b^2)(a^2-c^2)}$$
$$y^2 = \frac{(b^2-\xi_1)(b^2-\xi_2)(\xi_3-b^2)}{(a^2-b^2)(b^2-c^2)}$$
$$z^2 = \frac{(c^2-\xi_1)(c^2-\xi_2)(\xi_3-c^2)}{(a^2-c^2)(b^2-c^2)}.$$

The Dirichlet operators for the confocal ellipsoidal coordinates must be derived implicitly since $(\xi_1,\xi_2,\xi_3)$ can only be found from the roots of the third order polynomial equation in z, $$\frac{x^2}{a^2-z} + \frac{y^2}{b^2-z} + \frac{z^2}{c^2-z} = 1.$$

Cauchy-Kovalevskaya Extension Theorem

Similar to reproducing kernel concept, in the Reproducing Kernel portion of this document. it is possible to generate an analytic solution to the wave equation, given it's response on some closed surface. Suppose that the Dirac operator in a given coordinate system can be written as, $$D = D\psi_1 \frac{\partial}{\partial \psi_1} + D\psi_2 \frac{\partial}{\partial \psi_2} + D\psi_3 \frac{\partial}{\partial \psi_3},$$

for a coordinate parameterization ($\psi_1, \psi_2, \psi_3$). Suppose we know that given a fixed $\psi_3=0$, the coordinate system forms a closed surface (e.g. for spherical coordinates if $\psi_3=r-1$, then the closed surface is a sphere).

Define, $$D_{12} = D\psi_1 \frac{\partial}{\partial \psi_1} + D\psi_2 \frac{\partial}{\partial \psi_2} + jk.$$

Furthermore suppose we have a differential operator $\mu(\psi_3)$ that depends on $\psi_3$ and let $\phi(\psi_1,\psi_2)$ be the value of F restricted to the surface $\psi_3-0$. We will make the assumption that, $$(D+jk)\mu(\psi_3)\phi(\psi_1,\psi_2)=0 \quad (26)$$

so that $F(\psi_1,\psi_2,\psi_3)=\mu(\psi_3)\phi(\psi_1,\psi_2)$, satisfies the Helmholtz equation. If we require the operator $\mu(\psi_3)$ to be valid for any surface function $\phi(\psi_1,\psi_2)$, then Equation (26) requires the following functional equation, $$\left(D_{12} + D\psi_3 \frac{\partial}{\partial \psi_3}\right)\mu(\psi_3) = 0 \quad (27)$$
$$D\psi_3 \mu'(\psi_3) = -D_{12}\mu(\psi_3)$$
$$\mu'(\psi_3) = -(D\psi_3)^{-1}D_{12}\mu(\psi_3).$$

This yields the operator solution to $\mu(\psi_3)$, $$\mu(\psi_3)=\exp(-D\psi_3)^{-1}D_{12}\psi_3).$$

Thus the solution to the Helmholtz equation becomes, $$F(\psi_1,\psi_2,\psi_3)=\exp(-(D\psi_3)^{-1}D_{12}\psi_3)\phi(\psi_1,\psi_2).$$

As long as $\phi(\psi_1,\psi_2)$ is $C^\infty$, we can expand the operator function $\exp(-(D\psi_3)^{-1}D_{12}\psi_3)$ in power series of functions and derivatives with respect to $\psi_1$ and $\psi_2$ to obtain a solution that converges locally. This generalizes the Cauchy-Kovalevskaya extension theorem.

Another form of this has slightly better convergence properties. Starting from Equation (27) we write, $$\mu(s) = -\int_0^s (D\psi_3)^{-1}D_{12}\mu(\psi_3)d\psi_3 + 1, \quad (28)$$

noting that the initial conditions require $\mu(0)=1$. If $D_c \equiv (D\psi_3)^{-1}D_{12}$, then we can write this as the integro-differential operator, $$(1+\int D_c)\mu=1,$$

where $\int g \equiv \int_0^s g(\psi_3)d\psi_3$. One can now argue that, $$\mu = \sum_{q=0}^\infty \left(-\int D_c\right)^q,$$

which is equivalent to repeated applications of (28). We can now use this theorem to find the field reflected by the incident wavefront by assuming that $$\phi(\psi_1,\psi_2)=-\alpha n \tilde{F}_0(n\tilde{x}n)n,$$

for $x \in \partial R$ defined by $\psi_3=0$, and where $F_0(x)$ is the incident (transmitted) wave.

It is possible to extend the Kovalevskaya extension to actually recover the surface current paravector K for a perfect conductor and hence the reflected wave. Suppose we are given the reflected wave $F_r$, we can recover the outgoing surface component of this wave for $\psi_3 \geq 0$ via, $$P_+F_r \equiv \lim_{\psi_3 \to 0_+} F_r.$$

We actually take the Hardy projection on to the boundary, which requires that the limit be non-tangential, meaning that the limit sequence exists in a cone smaller than a half plane about it's limit.

Our extended Kovalevskaya extension recovers the original function from the boundary, namely $$\mu P_+ F_r = F_r.$$

We now involve the surface projection operators, $Q_+ + Q_- = 1$.

$$\mu(Q_+ + Q_-)P_+F_r = F_r$$
$$(1 - \mu Q_+ P_+)F_r = Q_- P_+ F_r$$
$$(1 - \mu Q_+ P_+)F_r = -Q_- P_+ F_0$$
$$F_r = -(1 - \mu Q_+ P_+)^{-1} Q_- P_+ F_0$$
$$= -\sum_{q=0}^\infty (\mu Q_+ P_+)^q Q_- P_+ F_0$$

We used here the electromagnetic continuity condition at the conductor boundary which requires $Q_- P_+(F_r+F_0)=0$, where $F_0$ is the incident wave.

This can be combined with Equation (28) to obtain the recursive formulas, $$F_r = \mu(\psi_3)(Q_+ P_+ F_r - Q_- P_+ F_0)$$

$$\mu(s) = 1 - \int_0^s D_c \mu(\psi_3) d\psi_3.$$

Convergence can be guaranteed for "small" $\mu Q_+ P_+$, which is possible as $\psi_3 \to 0$, for sufficiently smooth $F_0$.

The main obstacle for use appears to be the proliferation of symbolic terms for larger values of q.

Basis Functions and HOSVD

For a set of basis functions to approximate the scattered field, it is convenient to look the separable solutions of the Helmholtz equation, $(D^2+k^2)F=0$. There are 11 orthogonal coordinate systems that are separable by the Helmholtz operator. Several of those coordinate systems were described in Analytic Scattering Models. We examine the spherical coordinate system and the associated spherical harmonics that are solutions of the Helmholtz equation, as one possible example for generating appropriate basis functions.

The Laplacian in spherical coordinate systems can be written as, $$D^2 \psi = \frac{1}{r^2 \sin(\theta)}\left(\sin(\theta)\frac{\partial}{\partial r}\left(r^2 \frac{\partial \psi}{\partial r}\right) + \frac{\partial}{\partial \theta}\left(\sin(\theta)\frac{\partial \psi}{\partial \theta}\right) + \frac{1}{\sin(\theta)}\frac{\partial^2 \psi}{\partial \phi^2}\right).$$

If we set $\psi=R(kr)\Theta(\theta)\Phi(\phi)$, into the Helmholtz equation we obtain three separate ordinary differential equations:

$$\frac{1}{r^2}\frac{d}{dr}\left(r^2\frac{dR}{dr}\right)+k^2R-\frac{n(n+1)}{r^2}R=0$$

$$\frac{1}{\sin(\theta)}\frac{d}{d\theta}\left(\sin(\theta)\frac{d\Theta}{d\theta}\right)+\left(n(n+1)-\frac{m^2}{\sin^2(\theta)}\right)\Theta=0$$

$$\frac{d^2\Phi}{d\phi}+m^2\Phi=0.$$

From this we can obtain the general solutions, $$R(r)=B_1 h_n^1(kr)+B_2 h_n^2(kr),$$

where $h_n^1(kr)$ is the spherical Hankel function of the first kind, representing an inward traveling wave and $h_n^2(kr)$ is the spherical Hankel function of the second kind, representing an outward traveling wave. These functions satisfy some recursion relations and can be expressed in terms of Bessel functions of fractional order. Additionally we have, $$h_0^1(kr)=-i\frac{\exp(ikr)}{kr}$$

$$h_0^2(kr)=i\frac{\exp(-ikr)}{kr}$$

$$h_n^1(z)=z^n\left(-\frac{1}{z}\frac{d}{dz}\right)^n h_0^1(z)$$

$$h_n^2(z)=z^n\left(-\frac{1}{z}\frac{d}{dz}\right)^n h_0^2(z).$$

The polar angle dependency is solved by, $$\Theta(\theta)=P_n^m(\cos(\theta)),$$

where $P_n^m(x)$ is the Legendre polynomial of the first kind.

$$\Phi(\phi)=\exp(mj\phi).$$

The angular functions are typically collated into a single set of functions known as spherical harmonics $Y_n^m(\theta,\phi)$, $$Y_n^m(\theta,\phi)=\sqrt{\frac{(2n+1)(n-m)!}{4\pi(n+m)!}}P_n^m(\cos(\theta))e^{jm\phi}.$$

The spherical harmonics are orthogonal satisfying, $$\int_0^{2\pi}d\phi\int_0^{\pi}Y_{n'}^{m'}(\theta,\phi)Y_n^{m*}(\theta,\phi)\sin(\theta)d\theta=\delta_{n'n}\delta_{m'm},$$

where $\delta_{m'm}$ is the dirac-delta function. These functions are also complete, allowing the representation of any function on the sphere, $f(\theta,\phi)$ as a series of spherical harmonics. The spherical harmonics are often written as a function of the unit normal vector $$\hat{x}=\frac{x}{\|x\|},$$

as $Y_n^m(\hat{x})$, which is a polynomial function of the components of $\hat{x}$, called harmonic polynomials.

It is possible to decompose the spherical green's functions $h_0^1(kr)$ and $h_0^2(kr)$ into spherical waves when $$r=\|x-x_0\|. \text{ Let } x_> = \max\{\|x\|,\|x_0\|\}, x_> = \max\{\|x\|,\|x_0\|\},$$

$$\hat{x}=\frac{x}{\|x\|}, \hat{x}_0=\frac{x_0}{\|x_0\|}.$$

We can then write, $$\frac{\exp(jkr)}{jkr}=\sum_{l=0}^{\infty}(2l+1)j_l(kx_<)h^1(kx_>)P_l(\hat{x}\cdot\hat{x}_0), \qquad (29)$$

where $j_l(z)$ is the spherical Bessel function of the first kind and the real part of $h^1(z)$ for real z.

Note that, $$r=\sqrt{r_1^2+r_0^2-2r_1 r_0\cos(\theta)},$$

where $r_0=\|x_0\|$, $r_1=\|x\|$, and $x_0^T x=r_1 r_0 \cos(\theta)$.

Suppose that $r(r_0,r_1,\cos(\theta))=\sqrt{r_1^2+r_0^2-2r_1 r_0\cos(\theta)}$, and that we seek to find a decomposition similar to Equation (29) of the form, $$r(r_0,r_1,\cos(\theta))=\sum_l \sigma_l\alpha_l(r_0)\beta_l(r_1)\gamma_l(\cos(\theta)). \qquad (30)$$

Furthermore we seek such a decomposition that gives us the best fit to $r(\bullet)$, with the minimum number of terms. This problem is very similar to singular value decomposition for matrices, but here the problem is multi-linear containing multiple "eigen-vectors", $\alpha_l(r_0)$, $\beta_l(r_1)$, and $\gamma_l(\cos(\theta))$. This problem can be solved using a device called multilinear singular value decompositions, or higher order svd (HOSVD). This decomposition reduces a multilinear form $\mathcal{A}$ (tensor) into a sum of mixed eigenvectors of the form, $$\mathcal{A}_{j_1 j_2 \ldots j_N}=\sum_{i_1}\sum_{i_2}\cdots\sum_{i_N}s_{i_1 i_2 \ldots i_N}U_{j_1 i_1}^{(1)}U_{j_2 i_2}^{(2)}\cdots U_{j_N i_N}^{(N)},$$

where the $U_{ji}^{(n)}$ are unitary matrices (entry (j,i)), and where $s_{i_1 i_2 \ldots i_N}$ have all-orthogonal subtensors and $\|s_{i_1 i_2 \ldots i_N}\|_{ij=q}^2$ decreases as q increases from 1 to $I_j$. This means $s_{i_1 i_2 \ldots i_N}$ is treated as a flat vector while holding one of the indices $i_j$ fixed. The entries $s_{i_1 i_2 \ldots i_N}$ can be sorted from largest to smallest norm, and the indices flattened to make the decomposition look like, $$\mathcal{A}_{j_1 j_2 \ldots j_N}=\sum_q s_q U_{j_1 i_1(q)}^{(1)}U_{j_2 i_2(q)}^{(2)}\cdots U_{j_N i_N(q)}^{(N)}. \qquad (31)$$

The indices for these tensors all represent the values of continuous parameters, that have been densely sampled.

An example of the use of the HOSVD on the spherical Green's function on the left hand side of Equation (29) is shown in FIG. 11. We allow $r_1$ to range from 2.2 to 5 meters in increments of a centimeter, and $r_0$ ranges from 0.2 to 2.0 meters, while $\cos(\theta)$ is allowed to range from −1 to 1 in increments of 0.005. After applying the HOSVD, then flattening and sorting the singular values, we plot the sorted singular values in FIG. 11. Only 0.025 percent of the singular values are significant contributors to the total value of the waveform. This means that a massive simplification and compression is possible should one tabulate the Green's function and decompose it into a separable product of functions of $r_1$, $r_0$ and $\cos(\theta)$.

Furthermore those functions of $r_1$, $r_0$ and $\cos(\theta)$ are smooth as can be seen by the locus plots in FIG. 12 and can be approximated by differentiable splines. This greatly facilitates the use of the integral formulas for the reproducing kernels in Equation (20) and Equation (24). One uses a coordinate system in this case whose origin is at the center of the scatterer and then uses a kernel decomposition such as the HOSVD or the analytic Equation (29) to evaluate the integral over the surface in closed form. For the latter analytic case, the reproducing kernel itself can be found by applying the D-kj operator to the left of each term of the Green's function. Ideally however it would be preferable to perform the Green's function decomposition using the coordinate system appropriate for the reflector boundary type.

Harmonic functions generated by using HOSVD operations can be used as basis functions in general. Indeed we can apply the Helmholtz equation as a constraint, while matching Dirichlet style boundary conditions for any given surface. Suppose we decomposed the reproducing Kernel Equation (23) in a form similar to Equation (30), $$h_-(x-x_0) = \sum_l d_l a_l(x) b_l(y) c_l(z), \quad (32)$$

where $x = xe_1 + ye_2 + ze_3$, is the receiver location and $d_l$ are Clifford numbers. The field values are evaluated at the receiver location $x_0$, which is fixed for each receive antenna. We can either use the reproducing kernel to produce the field at the receiver, or we can use these functions to fit the boundary conditions on a closed surface, using any convenient parameterization of that surface. Typically we would place the coordinate center at the center of the scattering object.

For the reproducing kernel case we have from Equation (20) and Equation (32) for rectangular coordinates $$g(x_0) = \sum_l d_l \int_{\partial R} a_l(x) b_l(y) c_l(z) dx^* F_r(x).$$

The scalar voltage could then be written as, $$V = \sum_l b \cdot \int_{\partial R} a_l(x) b_l(y) c_l(z) \langle d_l dx^* F_r(x) \rangle_R,$$

where b is the vector effective length for the receive antenna we are analyzing and $F_r(x)$ is found from Equation (18). We can also use any coordinate parameterization for which the scatterer represents a level surface, not just a rectangular decomposition.

If 3-space is parameterized by $\psi_1, \psi_2, \psi_3$, and the closed surface of the scatterer is described by $\psi_1 = \rho$, a constant we can use the HOSVD to decompose the reflected wave $$v(\psi_1, \psi_2, \psi_3) \equiv b \cdot \langle dx^* F_r(\psi_1, \psi_2, \psi_3) \rangle,$$

$$v(\psi_1, \psi_2, \psi_3) \approx \sum_l \vartheta_l \alpha_l(\psi_1) \beta_l(\psi_2) \gamma_l(\psi_3).$$

The HOSVD operation is performed over a discretized function of several variables, but we can use splines to interpolate the function values $\alpha_l(\psi_1)$, $\beta_l(\psi_2)$ and $\gamma_l(\psi_3)$. We also modify the algorithm to satisfy the Helmholtz equation, $$(D^2 + k^2) v(\psi_1, \psi_2, \psi_3) = 0$$

where $$D = D_{\psi_1} \frac{\partial}{\partial \psi_1} + D_{\psi_2} \frac{\partial}{\partial \psi_2} + D_{\psi_3} \frac{\partial}{\partial \psi_3}.$$

The operator $D^2$ will be a scalar operator that can be discretized and treated as a multi-linear tensor contraction on $v(\psi_1, \psi_2, \psi_3)$. This can be flattened to simply look like a matrix. To obtain the approximation we attempt to solve the Lagrangian problem, $$\max_\lambda \min_{\alpha_l, \beta_l, \gamma_l, \vartheta_l} \int_{\psi_1 \psi_2 \psi_3} \left( \left\| v(\rho, \psi_2, \psi_3) - \sum_l \vartheta_l \alpha_l(\rho) \beta_l(\psi_2) \gamma_l(\psi_3) \right\|^2 + \quad (33)$$

$$\ldots \lambda \left\| (D^2 + k^2) \sum_l \vartheta_l \alpha_l(\psi_1) \beta_l(\psi_2) \gamma_l(\psi_3) \right\|^2 \right)$$

Here the integration $\int_{\psi_1 \psi_2 \psi_3}$ is approximated by a sum over a region of points likely to represent a receiver/scatterer location. Similar to the power method for eigenvalue problems, we can use alternating directions optimization to obtain functions and coefficients for this approximation problem.

Now implicitly $v(\psi)$ is dependent on the center of the scattering body $x_r$, which is one of the parameters we need to estimate. After solving the Lagrange constrained minimization problem in Equation (33) we obtain an approximating series solution $\Sigma_l \vartheta_l \alpha_l(\psi_1) \beta_l(\psi_2) \gamma_l(\psi_3)$ also dependent on $x_r$. Thus the voltage seen at receiver position $x_0$ is given by $V_0(x_r) = \Sigma_l \vartheta_l \alpha_l(\psi_1^0) \beta_l(\psi_2^0) \gamma_l(\psi_3^0)$, where $(\psi_1^0, \psi_2^0, \psi_3^0)$ is the parameterized coordinates of $x_0$ relative to $x_r$. If we compute this over a dense set of possible reflector positions we obtain another non-linear function that can be decomposed as a function of $x_r = (x_r, y_r, z_r)$. This function can be decomposed again using HOSVD techniques to obtain, $$V_0(x_r) = \sum_l \varsigma_l q_l(x_r) u_l(y_r) v_l(z_r). \quad (34)$$

Of course the voltage could theoretically be obtained using any electromagnetic modeling tool, that can model the scatterer and obtain the voltage at the receive antennas. The key point here as that these computations can be done offline as part of the calibration process. Only the final "tabulated" voltage as a function of scatterer position needs to be retained for our algorithm purposes.

Image Techniques

Similar to the electrostatic case, it is possible to place image sources to satisfy electromagnetic boundary conditions. For a given dipole moment vector b we can write the electromagnetic vector for the simplest case of the Hertzian dipole as, $$F = E + icB,$$

where, $$B = \frac{-e^{-jkr}}{4\pi cr}\left(kj + \frac{1}{r}\right)e_r \times b, \quad (35)$$

$$E = \frac{-e^{-jkr}}{4\pi r}\left(\left(k^2 - \frac{jk}{r} - \frac{1}{r^2}\right)P_\perp(e_r)b + 2\left(\frac{kj}{r} + \frac{1}{r^2}\right)P(e_r)b\right),$$

where $e_r \equiv Dr = x/r$ and $P(e_r)b = e_r(e_r \cdot b) = \frac{1}{2}(b + e_r b e_r)$ and $P\perp(e_r)b = b - e_r(e_r \cdot b) = \frac{1}{2}(b - e_r b e_r)$.

Suppose we have a Hertzian dipole 1 a distance h above an electromagnetic screen. We intend to place an image dipole 2 at a distance h below the screen, so that we can generate a reflected field, $-n\tilde{F}(n\tilde{x}n)n$, whose superposition with the incident field satisfies the boundary conditions.

This situation is illustrated in FIG. 13.

If the coordinate origin is on the electromagnetic screen, and $x_1$ is the center position of Dipole number 1 and n is the unit normal to the conducting surface, then the coordinate center for dipole 2, $x_2$ is it's reflection through the conducting plane P, ie $x_2 = -nx_1 n$. Note that the reflection operator is a homomorphism, ie if $R_n(x) \equiv n\tilde{x}n$, then $R_n(ab) = R_n(a)R_n(b)$, and $R_n(x) = x$, when $x \in P$. We can write the reflected field as, $$F_r = -n\tilde{F}(n\tilde{x}n)n$$
$$= -R_n(E) + icR_n(B).$$

Suppose we decompose the E and B field into it's tangential and normal components, $$E = E_n + E_t,$$

$$B = B_n + B_t,$$

then we have, $$R_n(E) = -E_n + E_t$$

$$R_n(B) = -B_n + B_t.$$

From this and the fact that the radii are the same for both the reflected field and the original field, we see that at boundary surface the total field is, $$F_{tot} = F_r + F$$
$$= 2E_n + 2icB_t.$$

This shows that the correct boundary conditions are satisfied inasmuch as the total tangential component of the electric field and the total normal component of the magnetic field vanish.

Because of the homomorphism properties of the reflection operator it is seen that the reflected field is the same as that due to an image dipole with dipole moment $b_2 = nbn$ at the reflected position $x_2 = -nx_1 n$. The reflected electromagnetic field becomes, $$B = \frac{-e^{-jkr_2}}{4\pi cr_2}\left(kj + \frac{1}{r_2}\right)e_{r_2} \times b_2,$$

$$E = \frac{-e^{-jkr_2}}{4\pi r_2}\left(\left(k^2 - \frac{jk}{r_2} - \frac{1}{r_2^2}\right)P_\perp(e_{r_2})b_2 + 2\left(\frac{kj}{r_2} + \frac{1}{r_2^2}\right)P(e_{r_2})b_2\right),$$

where, $$r_2 = \|x - x_2\|^2$$

$$e_{r_2} = \frac{x - x_2}{r_2}.$$

Imaging techniques are a powerful way to handle rectangular boundaries. It's a good way to model electromagnetic propagation near the ground or over water by treating the ground as an electromagnetic conducting screen. Multiple plane boundaries can be modeled by reflected each additional image across the new plane introduced into the environment. In the next section we will show how the concept can be extended to spherical boundaries using conformal mappings in 4-space. Furthermore it is straightforward to extend the technique to arbitrary spherical harmonics using the reflection operator $R_n(F)$.

Conformal Mappings

A conformal map in a Clifford algebra takes the form of a Möbius transform, $$\phi(x) = (ax + b)(cx + d)^{-1}.$$

Where a, b, c and d are members of the Clifford group $\Gamma_3$, which are products of non-zero vectors in $Cl_{0,3}$. These mappings preserve the surface integrals in (16), namely $$\int_{\partial R} h(y)dy^* g(y) = \int_{\partial R} h(\phi(x))J^\dagger(\phi, x)dx^* J(\phi, x)g(\phi(x)),$$

where $$J(\phi, x) \equiv \frac{(cx + d)^\dagger}{\|cx + d\|^3}.$$

This implies, $$\int_R ((h(D - jk))g + h(D + jk)g)dV =$$
$$\int_{\phi^{-1}(\partial R)} h(\phi(x))J^\dagger(\phi, x)dx^* J(\phi, x)g(\phi(x)).$$

Assuming h(y) is the reproducing kernel in (21), and that g(y)) is left monogenic (ie satisfies the Helmoltz equation (D+jk)g=0, we obtain, $$g(y_0) = \int_{\phi^{-1}(\partial R)} h(\phi(x) - \phi(x_0))J^\dagger(\phi, x)dx^* J(\phi, x)g(\phi(x)).$$

where $y_0 = \phi(x_0)$. This demonstrates that one can use conformal maps to change the surfaces over which a solution can be evaluated.

In particular the Möbius transform is known to map spheres to spheres, where a "sphere" of infinite radius is a half plane. Thus we can formulate a solution to the boundary value problem in the half plane, using say the imaging solution of the prior section and then use a conformal map to map the problem to a sphere or vice-versa.

Another way we can use conformal maps is to use Vekua operator to map a solution of the Laplace equation (k=0) to a solution of the full Helmholtz equation. Conformal maps preserve the analytic property of annihilating the Dirac operator. Thus if $Dg(x)=0$, then $DJ$ $(\phi,x)$ $g$ $(\phi(x))=0$. However we can use the Vekua operator to map this to a solution that also satisfies the Helmholtz wave equation $D^2u(x)+k^2u(x)=0$, via, $$u(x) = J(\phi, x)g(\phi(x)) - \int_0^1 \frac{k|x|}{2} \frac{t^{\frac{N-2}{2}}}{\sqrt{1-t}} J_1(k|x|\sqrt{1-t}) g(\phi(tx))dt,$$

where $J_1(\bullet)$ is the first order Bessel function of the first kind. The Vekua transform is actually a general way to associate solutions of the ordinary Laplace equation with solutions of the Helmholtz equation.

Calibration

The calibration procedures for an array that is required to perform geolocation consists of fitting a set of interpolating basis functions to a set of observed voltages seen on the array, for targets/reflectors at known positions in space. A lab or anechoic chamber is typically used for initial calibration. Calibration occurs not just for the free parameters of channel model, but also can occur over different target types for a radar application, or even dynamic targets that involve gestures, beating hearts, or varying dielectric properties of materials.

Let $v_{mk}^q(p_q)$ be the voltage seen by the m'th sensor, k'th frequency/channel and the q'th calibration collect, and where $p_q$ is the "position" and shape parameter vector, for the q'th calibration event. The calibration process attempts to fit a linear combination of basis functions to the observed voltages. The fit metric is usually least squares, $$\mu = \sum_{mkq} \left\| v_{mk}^q(p_q) - \sum_l \alpha_{mk}^l b_{lm}(p_q) \right\|^2. \tag{36}$$

The basis functions $b_{lm}(p_q)$ are a function of the position/shape parameter vector $p_q$, antenna index m and calibration index q. While it's generally not a good ideal to calibrate in the presence of interference, we might also presume that the received data and the basis functions have been interference whitened over the antenna index. We of course expect the basis functions to be different for different shapes in radar applications whose signals are reflected off of scatterers of different geometries.

The necessary conditions for the least squares calibration are given by, $$\sum_q b_{lm}^*(p_q)\left(\sum_n \alpha_{mk}^n b_{nm}(p_q) - v_{mk}^q(p_q)\right) = 0$$

$$\sum_n \sum_q b_{lm}^*(p_q) b_{nm}(p_q) \alpha_{mk}^n = \sum_q b_{lm}^*(p_q) v_{mk}^q(p_q).$$

So for each antenna-frequency pair we have the following L×L linear equation solution, $$a_{mk} = R_{b_m b_m}^{-1} R_{b_m v_{mk}} \tag{37}$$

where the l'th element of $a_{mk}$ is $\alpha_{mk}^l$ the l, n'th element of the matrix $R_{b_m b_m}$ is $\Sigma_q b^*_{lm}(p_q) b_{nm}(p_q)$ and the l'th element of $R_{b_m v_{mk}}$ is $\Sigma_q b^*_{lm}(p_q) v_{mk}^q(p_q)$.

It is interesting to note that certain coordinate systems allow the interpolation of the wave equation over all space once the voltages are defined over a closed surface. Thus is suffices to sample the environment in the near-field over an appropriate closed surface. In general however we are often required to grossly sub-sample the array response. In this case we can often choose the few dominant terms in our basis function, either found using HOSVD as in Basis Functions and HOSVD, or using something similar to Generalized Spherical harmonics from the same Section. The higher order harmonics have decreasing contributions to the overall wave function, especially in the far field.

Obtaining The Basis Functions

From Channel Modeling as described herein, a variety of techniques for generating analytic formulas for the wave-function are shown, even for complex scatterers. Here we give a brief overview of the procedure.

1. Generate a model for the transmitted electromagnetic field.
2. Predict the field being scattered (for radar applications) off of the desired target type.
3. Use the prediction to generate basis functions for the received voltage at each antenna receiver and frequency,
4. Collect data in the near field for multiple scatterer/receiver positions,
5. Use least squares to estimate the complex combining weights for the basis functions.

The model for the transmitted electromagnetic field is at least partially determined by numerical modeling of the antenna array. We have seen a formula for the Hertzian dipole given in Equation 35. This formula actually corresponds to the first order Spherical Harmonics. In general we might write the electromagnetic vector potential as, $$A_u(x) = h_{n(u)}^2(kr) Y_{n(u)}^{m(u)}(\hat{x}) b,$$

where the u index has been flattened to include all m and n components of the spherical Harmonics, and b is a dipole moment vector of the transmitting antenna. We can also use the $h_{n(u)}^1$ (kr) for incoming waves. Similar considerations can be made for other coordinate systems.

From this we obtain the electric field from Equation (22) as, $$E_u(x) = -D\phi_u(x) - jkcA_u(x)$$

$$\phi_u(x) = \frac{-c}{jk} D \cdot A_u(x)$$

$$B_u(x) = D \times A_u(x).$$

We then use one of the several scattering modeling techniques described in Analytic Scattering Models to obtain an induced scattered field $\breve{E}_u(x_m; p_q)$ at receiver position $x_m$ and scatterer parameter vector $p_q$. The scattered field itself may require a series solution for each transmitted $E_u(x)$ and we may see a multi-parameter basis function of the form, $\breve{E}_{pu}(x_m; p_q)$, whose indices (p,u) can either be index flattened to $\breve{E}_l(x_m; p_q)$, or further sub-selected on the basis of the largest singular values using HOSVD techniques described in Basis Functions and HOSVD.

Finally the actual voltage and the scalar basis function is obtained via the vector effective length for antenna m, $$b_{lm}(p_q) = b_m \cdot \breve{E}_l(x_m; p_q).$$

Once the complex gains for the model are determined from (37), we have a series solution model for the received voltage that can be used in the parameter estimation and tracking models of Geolocation and Tracking.

Calibration Model Modifications

There are a number of modifications to the basis function model we have proposed so far that may come into play. The first occurs when we only have a sparse number of calibration points to work with. This can happen when calibration is very expensive or can not be automated.

We can relax the requirement of learning a new set of gains for every frequency index k, by creating a structured version of our calibration gains, namely:

$$\alpha_{mk}^l = \beta_m^l \gamma_k.$$

This asserts that the basis functions via it's dependency on the wavenumber k suffices to interpolate over frequency, outside some frequency dependent gains on the transmit to receive antenna path. The structured gains can be found by holding the $\beta_m^l$ terms constant and minimizing over $\gamma_k$, followed by holding the $\gamma_k$ constant and optimizing over $\beta_m^l$. This is repeated until convergence.

Another modification occurs if we use the pre-computed grid points suggested in (25). This would use more of a discrete point model for the reflector surface points. Those values, rather than the basis function coefficients become the output of the calibration process, though modeling the transmit antenna response may well use interpolating basis functions as described earlier.

Finally we may find that multiple nearby receive antennas mutually couple. If we model these antennas as re-radiating scatterer, than each antenna has a fixed contribution to another nearby antenna that is a complex multiply of it's receive voltage. This can be modeled as an additional mixing matrix added to the final received voltage, ie, $$v_{mk}^q(p_q) \approx \sum_{m'} C_{mm'} \sum_l \alpha_{m'k}^l b_{lm'}(p_q).$$

The mixing matrix can also be discovered as part of the calibration process. Again we use iterative alternating directions least squares optimization for each linear component as a technique for determining these coefficients from a sufficiently dense calibration table $v_{mk}^q(p_q)$.

In one or more of the embodiments of the present invention there is provided a method of parameter estimation in a multi-channel signal environment system where a plurality of receive antennas receive signals from one or more transmitters that transmit a signal or wave that is reflected from one or more targets, or receive antennas that receive directly from the transmitters, whose received signals are processed over multiple frequencies or channels by a digital receiver. One or more processors may be provided with processing comprises the steps of: (a) calibrating before the operation of the digital receiver to determine the free parameters of a mathematical model of a channel either as the channel model parameters or in the form of tabulated data; (b) calibrating during the operation of the digital receiver to determine the channel model; (c) comparing received antennas array voltages to an analytic or table driven channel model from a calibrated template without only relying on information lossy intermediate steps such as delay time of arrival or angle of arrival measurements; (d) creating a statistical likelihood function modeling receiver noise to determine model channel parameters or prior channel uncertainty; (e) saving target reflector/emitter parameters to be reused for dynamic tracking; and (f) using Bayesian particle filtering or Maximum Likelihood Methods to update mixture models for the unknown parameters.

The method may use Bayesian detection or other Statistical Signal Processing Techniques for the estimation of channel parameters such as location parameters, shape parameters and reflector electromagnetic parameters. Various aspects of the invention could be defined wherein:

the transmitted signal is a frequency stepped radar;

a statistical likelihood function is used to determine target type or target position;

a channel template for each target type is used to further classify the target type or estimate the target position;

static direct path clutter is removed via a cancellation algorithm;

the parameter estimation blindly calculates an unknown gain and phase constant $\beta q$ over each channel observation q, to absorb bulk phase and gain changes between observations;

the statistical likelihood function takes the form of a Cauchy quotient and is therefore a member of the numerical range of a parameterized matrix as exhibited in Equation (14).

the target classification is determined from the likelihood function using the posterior probability of detection via Bayes theorem;

the target classification is determined from the likelihood function after blindly estimating any position dependent parameters during the classification process itself;

the target classification is determined from the likelihood function after blindly estimating phase terms such as time delays of arrival;

the target classification is determined from the likelihood function after blindly estimating phase delays using fast Fourier transform (FFT) processing;

the target classification or position parameters are determined from the likelihood function that assumed the scale parameters $\beta q = \beta$, are independent of the collection index and can therefore be solved using the generalized eigenvalue problem in Equation (8);

the DSP processing hardware is configured to enable parallel likelihood function calculations wherein the same instruction across all processing resources;

the DSP hardware has built in support for parallel reduction for primitive associative operations like addition, maximization, minimization or multiplication to enable the parallel computation of the likelihood function;

multiple transmit and receive RF chains are packed into an radio frequency (RF) integrated circuit (IC) with clocks controlled by a phased locked loop;

the signals from each antenna are down converted and digitized by a bank of analog to digital converters, where they are further decimated to obtain a sample of the channel for each antenna and frequency in use;

the wave function can be further interpolated using basis functions that are reflected through objects of predetermined shape or presumed electrical properties;

interpolating uses a likelihood function to compute a fixed set of channel vectors α, modulating the basis functions, that can be used to interpolate the channel at an arbitrary target position;

the method further includes blindly calculating an unknown gain and phase constant $\beta q$ over each channel observation q, to absorb bulk phase and gain changes between observations;

the method further includes computing separate channel vectors $\alpha_c$ for each target type c;

the method further includes jointly computing the phase constants $\beta q$ and the channel vectors $\alpha_c$ by alternating directions optimization; ie iteratively estimating each parameter while holding the other fixed;

the method further includes assuming the inner product of the basis functions is independent of position resulting in an eigenvalue problem (10) that is used to learn the channel vectors during calibration;

the method further includes assuming the scale parameters $\beta q=\beta$, are independent of the collection index, and can therefore be solved using the generalized eigenvalue problem in Equation (8);

the method further calibrates a blind classifier by blindly estimating any position dependent parameters during the classification process itself, without necessarily using known target or array transceiver positions;

the method further calibratesg a blind classifier by after blindly estimating phase terms such as time delays during the classification process itself without necessarily using known target or array transceiver positions;

the method further calibrates a blind classifier by blindly estimating phase delays using FFT processing, during the classification process itself, without necessarily using known target or array transceiver positions;

the DSP processing hardware is configured to enable parallel likelihood function calculations, yet can share the same instruction across all processing resources;

the DSP hardware has built in support for parallel reduction for primitive associative operations like addition, maximization, minimization or multiplication to enable the parallel computation of the likelihood function;

multiple transmit and receive RF chains are packed into an RF IC, with clocks controlled by a phased locked loop;

the signals from each antenna are down-converted and digitized by a bank of analog to digital converters wherein the signals are further decimated to obtain a sample of the channel for each antenna and frequency in use; OR the likelihood function is itself used to further refine the presumed positions of the transmitter and receiver to improve the calibration channel model.

the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

I claim:

1. A method of parameter estimation in a multi-channel signal environment system where a plurality of receive antennas receive signals from one or more transmitters that transmit a signal or wave that is reflected from one or more targets, or receive antennas that receive directly from the transmitters, whose received signals are processed over multiple frequencies or channels by a digital receiver and one or more processors whose processing comprises the steps of:

calibrating before the operation of the digital receiver to determine free parameters of a mathematical model of a channel either as channel model parameters or in the form of tabulated data;

calibrating during the operation of the digital receiver to determine a channel model;

comparing received antennas array voltages to an analytic or table driven channel model from a calibrated template without only relying on information lossy intermediate steps such as delay time of arrival or angle of arrival measurements;

creating a statistical likelihood function modeling receiver noise to determine model channel parameters or prior channel uncertainty; and saving target reflector/emitter parameters to be reused for dynamic tracking; and using Bayesian particle filtering or Maximum Likelihood Methods to update mixture models for unknown parameters.

2. The method of parameter estimation of claim 1, further including using Bayesian detection or other Statistical Signal Processing Techniques for the estimation of channel parameters such as location parameters, shape parameters and reflector electromagnetic parameters.

3. The method of parameter estimation of claim 1, wherein the transmitted signal is a frequency stepped radar.

4. The method of parameter estimation of claim 1, wherein a statistical likelihood function is used to determine target type or target position.

5. The method of parameter estimation of claim 1, wherein a channel template for each target type is used to further classify the target type or estimate a target position.

6. The method of parameter estimation of claim 1, wherein static direct path clutter is removed via a cancellation algorithm.

7. The method of parameter estimation of claim 1, that blindly calculates an unknown gain and phase constant $\beta q$ over each channel observation q, to absorb bulk phase and gain changes between observations.

8. The method of parameter estimation of claim 1, wherein the statistical likelihood function takes the form of a Cauchy quotient and is therefore a member of the numerical range of a parameterized matrix as exhibited in Equation (14).

9. The method of parameter estimation of claim 1, wherein a target classification is determined from the likelihood function using the posterior probability of detection via Bayes theorem.

10. The method of parameter estimation of claim 9, wherein the target classification is determined from the statistical likelihood function after blindly estimating phase terms such as time delays of arrival.

11. The method of parameter estimation of claim 1, wherein a target classification is determined from the statistical likelihood function after blindly estimating any position dependent parameters during the classification process itself.

12. The method of parameter estimation of claim 11, wherein the target classification is determined from the statistical likelihood function after blindly estimating phase delays using fast Fourier transform (FFT) processing.

13. The method of parameter estimation of claim 11, wherein the target classification or position parameters are determined from the statistical likelihood function that assumed scale parameters $\beta q=\beta$, are independent of a collection index and can therefore be solved using the generalized eigenvalue problem in Equation (8).

14. The method of parameter estimation of claim 1, wherein DSP processing hardware is configured to enable parallel statistical likelihood function calculations wherein the same instruction across all processing resources.

15. The method of parameter estimation of claim 1, wherein DSP hardware has built in support for parallel reduction for primitive associative operations like addition, maximization, minimization or multiplication to enable the parallel computation of the statistical likelihood function.

16. The method of parameter estimation of claim 1, wherein multiple transmit and receive RF chains are packed into an radio frequency (RF) integrated circuit (IC) with clocks controlled by a phased locked loop.

17. The method of parameter estimation of claim 1, wherein the signals from each antenna are down converted and digitized by a bank of analog to digital converters, where they are further decimated to obtain a sample of the channel for each antenna and frequency in use.

18. The method of parameter estimation of claim 17, further includes blindly calculating an unknown gain and phase constant $\beta q$ over each channel observation q, to absorb bulk phase and gain changes between observations.

19. The method of parameter estimation of claim 17, wherein DSP processing hardware is configured to enable parallel statistical likelihood function calculations, yet can share the same instruction across all processing resources.

20. The method of parameter estimation of claim 17, wherein DSP hardware has built in support for parallel reduction for primitive associative operations like addition, maximization, minimization or multiplication to enable the parallel computation of the likelihood function.

21. The method of parameter estimation of claim 17, wherein multiple transmit and receive radio frequency (RF) chains are packed into an RF integrated circuit (IC), with clocks controlled by a phased locked loop.

22. The method of parameter estimation of claim 17, wherein the signals from each antenna are down-converted and digitized by a bank of analog to digital converters wherein the signals are further decimated to obtain a sample of the channel for each antenna and frequency in use.

23. The method of parameter estimation of claim 17, wherein the statistical likelihood function is itself used to further refine presumed positions of the transmitter and receiver to improve a calibration channel model.

24. The method of parameter estimation of claim 1, further interpolating a wave function using basis functions that are reflected through objects of predetermined shape or presumed electrical properties.

25. The method of parameter estimation of claim 24, wherein interpolating uses a likelihood function to compute a fixed set of channel vectors $\alpha$, modulating the basis functions, that can be used to interpolate the channel at an arbitrary target position.

26. The method of parameter estimation of claim 24, further including computing separate channel vectors $\alpha_c$ for each target type c.

27. The method of parameter estimation of claim 24, further including jointly computing the phase constants $\beta q$ and the channel vectors $\alpha_c$ by alternating directions optimization.

28. The method of parameter estimation of claim 24, further includes assuming an inner product of the basis functions is independent of position resulting in an eigenvalue problem (10) that is used to learn the channel vectors during calibration.

29. The method of parameter estimation of claim 24, further including assuming scale parameters $\beta q=\beta$, are independent of a collection index, and can therefore be solved using a generalized eigenvalue problem in Equation (8).

30. The method of parameter estimation of claim 24, further calibrating a blind classifier by blindly estimating any position dependent parameters during a classification process, without necessarily using known target or array transceiver positions.

31. The method of parameter estimation of claim 24, further calibrating a blind classifier by after blindly estimating phase terms such as time delays during the classification process itself without necessarily using known target or array transceiver positions.

32. The method of parameter estimation of claim 24, further calibrating a blind classifier by blindly estimating phase delays using fast Fourier transform (FFT) processing, during the classification process itself, without necessarily using known target or array transceiver positions.

* * * * *